United States Patent
Uehara et al.

(10) Patent No.: US 7,925,817 B2
(45) Date of Patent: Apr. 12, 2011

(54) COMPUTER SYSTEM AND METHOD FOR MONITORING AN ACCESS PATH

(75) Inventors: Keitaro Uehara, Kokubunji (JP); Yuji Tsushima, Hachioji (JP); Takashige Baba, Inagi (JP)

(73) Assignee: Hitachi, Ltd., Tokyo (JP)

( * ) Notice: Subject to any disclaimer, the term of this patent is extended or adjusted under 35 U.S.C. 154(b) by 46 days.

(21) Appl. No.: 12/422,438

(22) Filed: Apr. 13, 2009

(65) Prior Publication Data

US 2009/0265501 A1  Oct. 22, 2009

(30) Foreign Application Priority Data

Apr. 16, 2008  (JP) ................................. 2008-107002

(51) Int. Cl.
   G06F 13/00    (2006.01)
(52) U.S. Cl. ........................... 710/316; 710/305; 714/48
(58) Field of Classification Search .......... 710/316–317, 710/305–306; 713/300–324; 714/4, 113, 714/48

See application file for complete search history.

(56) References Cited

U.S. PATENT DOCUMENTS

| | | | |
|---|---|---|---|
| 7,058,738 B2 | 6/2006 | Stufflebeam, Jr. | |
| 2004/0153700 A1* | 8/2004 | Nixon et al. | 714/4 |
| 2006/0242353 A1 | 10/2006 | Torudbakken et al. | |
| 2007/0208898 A1* | 9/2007 | Pettey et al. | 710/312 |
| 2009/0187694 A1 | 7/2009 | Baba et al. | |

OTHER PUBLICATIONS

Unpublished U.S. Appl. No. 12/222,225.

\* cited by examiner

*Primary Examiner* — Mark Rinehart
*Assistant Examiner* — Kim T Huynh
(74) *Attorney, Agent, or Firm* — Mattingly & Malur, P.C.

(57) ABSTRACT

A computer system includes I/O devices coupled to PCI switches coupled via interfaces of a plurality of servers, and a management block for managing configurations of the PCI switches. The management block is configured to: set, to the PCI switch, a first access path including a virtual bridge coupling the interface of an active server and a virtual switch, and a virtual bridge coupling the I/O device and the virtual switch; set, to the PCI switch, a second access path including a virtual bridge coupling the interface of standby server of the plurality of servers and a virtual switch, and a virtual bridge coupling the I/O device used by the active server and the virtual switch; disable mapping of the second access path between the I/O device and the virtual bridge; and instruct the standby server to make access to the I/O device.

9 Claims, 23 Drawing Sheets

| SWITCH (421) | PORT# (422) | DIRECTION (423) | TYPE (424) | LINK DESTINATION (425) |
|---|---|---|---|---|
| 300a | 301a-1 | UP | HOST | 100a |
| | 301a-2 | UP | HOST | 100b |
| | 301a-3 | UP | HOST | 100c |
| | 301a-4 | UP | HOST | 100d |
| | 301a-5 | UP | HOST | 110e |
| | 301a-6 | UP | HOST | 110f |
| | 302a-1 | DOWN | DEVICE | 220a-1 |
| | 302a-2 | DOWN | - | - |
| | 302a-3 | DOWN | DEVICE | 220a-3 |
| | 302a-4 | DOWN | - | - |
| | 302a-5 | DOWN | DEVICE | 220a-5 |
| | 302a-6 | DOWN | - | - |
| | 302a-7 | DOWN | - | - |
| | 302a-8 | DOWN | DEVICE | 220a-8 |
| 300b | 301b-1 | UP | HOST | 100a |
| | 301b-2 | UP | HOST | 100b |
| | 301b-3 | UP | HOST | 100c |
| | 301b-4 | UP | HOST | 100d |
| | 301b-5 | UP | HOST | 110e |
| | 301b-6 | UP | HOST | 110f |
| | 302b-1 | DOWN | - | - |
| | 302b-2 | DOWN | DEVICE | 220b-2 |
| | 302b-3 | DOWN | - | - |
| | 302b-4 | DOWN | DEVICE | 220b-4 |
| | 302b-5 | DOWN | DEVICE | 220b-5 |
| | 302b-6 | DOWN | - | - |
| | 302b-7 | DOWN | DEVICE | 220b-7 |
| | 302b-8 | DOWN | - | - |

PORT MANAGEMENT TABLE 420

*FIG. 3*

RESOURCE ASSIGNMENT TABLE 430

| SWITCH | I/O DEVICE | HOST |
|---|---|---|
| 300a | 220a-1 | 100a |
| | 220a-3 | 100a |
| | 220a-5 | 100c |
| | 220a-8 | 100d |
| 300b | 220b-2 | 100b |
| | 220b-4 | 100b |
| | 220b-5 | 100d |
| | 220b-7 | 100c |

HOST MANAGEMENT TABLE 440

| HOST | ACTIVE/STANDBY TYPE |
|---|---|
| 100a | ACTIVE |
| 100b | ACTIVE |
| 100c | ACTIVE |
| 100d | ACTIVE |
| 110e | STANDBY |
| 110f | STANDBY |

VIRTUAL BRIDGE MANAGEMENT TABLE 460

| SWITCH 461 | VB # 462 | ENABLED 463 | DIRECTION 464 | MAP 465 | PORT# 466 | VH# 467 |
|---|---|---|---|---|---|---|
| 300a | 1 | YES | UP | YES | 301a-1 | 0 |
|  | 2 | YES | DOWN | YES | 302a-1 | 0 |
|  | 3 | YES | DOWN | YES | 302a-3 | 0 |
|  | 4 | NO | - | NO | - | - |
|  | 5 | NO | - | NO | - | - |
|  | 6 | YES | UP | YES | 301a-3 | 0 |
|  | 7 | YES | DOWN | YES | 302a-5 | 0 |
|  | 8 | YES | UP | YES | 301a-4 | 0 |
|  | 9 | YES | DOWN | YES | 302a-8 | 0 |
|  | 10 | NO | - | NO | - | - |
|  | 11 | NO | - | NO | - | - |
|  | 12 | NO | - | NO | - | - |
| 300b | 13 | NO | - | NO | - | - |
|  | 14 | NO | - | NO | - | - |
|  | 15 | YES | UP | YES | 301b-2 | 0 |
|  | 16 | YES | DOWN | YES | 302b-2 | 0 |
|  | 17 | YES | DOWN | YES | 302b-4 | 0 |
|  | 18 | YES | UP | YES | 301b-3 | 0 |
|  | 19 | YES | DOWN | YES | 302b-7 | 0 |
|  | 20 | YES | UP | YES | 301b-4 | 0 |
|  | 21 | YES | DOWN | YES | 302b-5 | 0 |
|  | 22 | NO | - | NO | - | - |
|  | 23 | NO | - | NO | - | - |
|  | 24 | NO | - | NO | - | - |

VIRTUAL SWITCH MANAGEMENT TABLE 450

| SWITCH 451 | VS # 452 | ENABLED 453 | START VB# 454 | NUMBER OF ENTRIES 455 |
|---|---|---|---|---|
| 300a | 1 | YES | 1 | 3 |
|  | 2 | NO | - | 0 |
|  | 3 | YES | 6 | 2 |
|  | 4 | YES | 8 | 2 |
|  | 5 | NO | - | 0 |
| 300b | 6 | NO | - | 0 |
|  | 7 | YES | 15 | 3 |
|  | 8 | YES | 18 | 2 |
|  | 9 | YES | 20 | 2 |
|  | 10 | NO | - | 0 |

FIG. 6

PORT MANAGEMENT TABLE 320b

| PORT# | DIRECTION | TYPE | LINK DESTINATION |
|---|---|---|---|
| 301b-1 | UP | HOST | 100a |
| 301b-2 | UP | HOST | 100b |
| 301b-3 | UP | HOST | 100c |
| 301b-4 | UP | HOST | 100d |
| 301b-5 | UP | HOST | 110e |
| 301b-6 | UP | HOST | 110f |
| 302b-1 | DOWN | – | - |
| 302b-2 | DOWN | DEVICE | 220b-2 |
| 302b-3 | DOWN | – | - |
| 302b-4 | DOWN | DEVICE | 220b-4 |
| 302b-5 | DOWN | DEVICE | 220b-5 |
| 302b-6 | DOWN | – | - |
| 302b-7 | DOWN | DEVICE | 220b-7 |
| 302b-8 | DOWN | – | - |

*FIG. 10*

VIRTUAL BRIDGE MANAGEMENT TABLE 340a

| VB# | ENABLED | DIRECTION | MAP | PORT# | VH# |
|---|---|---|---|---|---|
| 1 | YES | UP | YES | 301a-1 | 0 |
| 2 | YES | DOWN | YES | 302a-1 | 0 |
| 3 | YES | DOWN | YES | 302a-3 | 0 |
| 4 | NO | - | NO | - | - |
| 5 | NO | - | NO | - | - |
| 6 | YES | UP | YES | 301a-3 | 0 |
| 7 | YES | DOWN | YES | 302a-5 | 0 |
| 8 | YES | UP | YES | 301a-4 | 0 |
| 9 | YES | DOWN | YES | 302a-8 | 0 |
| 10 | NO | - | NO | - | - |
| 11 | NO | - | NO | - | - |
| 12 | NO | - | NO | - | - |

VIRTUAL SWITCH MANAGEMENT TABLE 330a

| VA# | ENABLED | START VB# | NUMBER OF ENTRIES |
|---|---|---|---|
| 1 | YES | 1 | 3 |
| 2 | NO | - | 0 |
| 3 | YES | 6 | 2 |
| 4 | YES | 8 | 2 |
| 5 | NO | - | 0 |

*FIG. 11*

VIRTUAL BRIDGE MANAGEMENT TABLE 340b

| VB# | ENABLED | DIRECTION | MAP | PORT# | VH# |
|---|---|---|---|---|---|
| 13 | NO | - | NO | - | - |
| 14 | NO | - | NO | - | - |
| 15 | YES | UP | YES | 301b-2 | 0 |
| 16 | YES | DOWN | NO | 302b-2 | 0 |
| 17 | YES | DOWN | NO | 302b-4 | 0 |
| 18 | YES | UP | YES | 301b-3 | 0 |
| 19 | YES | DOWN | YES | 302b-7 | 0 |
| 20 | YES | UP | YES | 301b-4 | 0 |
| 21 | YES | DOWN | YES | 302b-5 | 0 |
| 22 | NO | - | NO | - | - |
| 23 | NO | - | NO | - | - |
| 24 | NO | - | NO | - | - |

VIRTUAL SWITCH MANAGEMENT TABLE 330b

| VA# | ENABLED | START VB# | NUMBER OF ENTRIES |
|---|---|---|---|
| 6 | NO | - | 0 |
| 7 | YES | 15 | 3 |
| 8 | YES | 18 | 2 |
| 9 | YES | 20 | 2 |
| 10 | NO | - | 0 |

*FIG. 12*

STANDBY HOSTS ACCESSIBILITY CHECK TABLE 470

| STANDBY HOST | ACTIVE HOST | SWITCH | I/O DEVICE | ACCESS RESULT |
|---|---|---|---|---|
| 110e | 100a | 300a | 220a-1 | OK |
| | | | 220a-3 | OK |
| | 100b | 300b | 220b-2 | OK |
| | | | 220b-4 | NG |
| | 100c | 300a | 220a-5 | OK |
| | | 300b | 220b-7 | OK |
| | 100d | 300a | 220a-8 | OK |
| | | 300b | 220b-5 | OK |
| 110f | 100a | 300a | 220a-1 | OK |
| | | | 220a-3 | OK |
| | 100b | 300b | 220b-2 | OK |
| | | | 220b-4 | OK |
| | 100c | 300a | 220a-5 | NG |
| | | 300b | 220b-7 | OK |
| | 100d | 300a | 220a-8 | OK |
| | | 300b | 220b-5 | OK |

*FIG. 15*

STANDBY HOSTS ACCESSIBILITY MATRIX 480

| | ACTIVE HOST | | | |
|---|---|---|---|---|
| | 100a | 100b | 100c | 100d |
| STANDBY HOST 110e | OK | NG | OK | OK |
| 110f | OK | OK | NG | OK |
| | | | | |

*FIG. 16*

COMPUTER SYSTEM AND METHOD FOR MONITORING AN ACCESS PATH

CLAIM OF PRIORITY

The present application claims priority from Japanese patent application JP2008-107002 filed on Apr. 16, 2008, the content of which is hereby incorporated by reference into this application.

BACKGROUND

This invention relates to a computer system in which a plurality of servers and a plurality of PCI devices are coupled by PCI switches, and more particularly, to a control technology for a computer system including active servers and standby servers, in which, when an active server fails, a standby server is activated to take over PCI devices.

Recently, in order to simplify server management, blade servers in which a plurality of servers are mounted on one device have been employed as is described in U.S. Pat. No. 7,058,738. Moreover, a multi-core configuration in which a CPU includes a plurality of processing cores has increased processing capability of the CPU, and in order to efficiently use the CPU thus improved, a virtual server technology in which a plurality of virtual servers operate on one computer has been employed.

A computer uses, for network communication with other computers and coupling to storage devices, I/O devices such as a network interface card (NIC) and a fiber channel-host bus adapter (FC-HBA), and when a plurality of servers operate on one computer as described above, the number of I/O devices assigned to the computer becomes relatively insufficient. As a technology for overcoming this problem, there is known a multi-root PCI switch technology for enabling coupling between a plurality of computers and peripheral component interconnect (PCI) devices (or PCI express devices), which are a plurality of I/O devices. In the multi-root PCI switch technology, the number of PCI devices which can be coupled to one computer can be variable in a scalable manner as is described in U.S. Pat. No. 7,058,738, and US 2006/242353. In a multi-root I/O virtualization technology described in the latter, by sharing one PCI device, the number of PCI devices can virtually be increased. By using those technologies, it is possible to solve the problem of insufficient number of I/O devices when virtual servers are used.

Moreover, a cluster system in which a plurality of servers are operated while they are separated into active servers which are in operation and standby servers which are activated upon a failure of an active server is widely known.

SUMMARY

In the above-mentioned conventional cluster system, when a failure occurs in the active server, and the active server is switched to the standby server, since the active server and the standby server are each provided with an I/O adapter (I/O device), there has been a problem that, unless an identifier of the I/O adapter of the standby server is changed to an identifier of the I/O adapter of the active server, the I/O device of the server cannot be used in the same environment as the active server.

In other words, in the conventional cluster system, since relationships between the servers and the I/O adapters are fixed, when the active server is switched to the standby server, it is necessary to switch the I/O adapters at the same time. As the I/O adapters, for example, a host bus adapter (HBA) used for coupling via a fiber channel to a storage area network (SAN) has a world wide name (WWN) unique to the HBA, a storage device coupled to the I/O adapter identifies a computer of access source according to the WWN. Accordingly, when the I/O adapters are switched, the WWN needs to be rewritten to the value of the I/O adapter of the active system. Therefore, in the conventional cluster system, there is a restriction that an HBA having an unchangeable WWN cannot be used.

In order to overcome this restriction, the following configuration is conceivable. The above-mentioned multi-root PCI switches are employed, and active and standby servers and an I/O adapter are coupled to the multi-root PCI switches, and, when the active server is switched to the standby server, a path from the active server to the I/O adapter is switched to a path from the standby server to the I/O adapter.

In this case, when a failure is present in a path from the standby server to the I/O adapter being used by the active server, it is necessary for another standby server to take over the active server, and there has been a problem that a period increases in which an application task provided by the active server is stopped.

Moreover, because the active server is using the I/O adapter, there has been a problem that whether or not a failure is present in a path from the standby server to the I/O adapter cannot be detected.

In view of the above-mentioned problems, the present invention has been made, and it is therefore an object of the present invention to detect, in a computer system in which I/O devices are taken over from an active server to a standby server, whether or not a failure is present in a path from the standby server to the I/O device being used by the active server.

A representative aspect of the present invention is as follows. A computer system comprising: a plurality of servers each comprising a processor, a memory, and an interface; a PCI switch coupled to the plurality of servers via the interfaces; an I/O device coupled to the PCI switch; and a management block for managing a configuration of the PCI switch, wherein: the management block comprises: a switch management block for setting a first access path coupling an active server of the plurality of servers and the I/O device with each other; and a host management block for instructing a standby server of the plurality of servers to make access to the I/O device used by the active server; the switch management block is configured to: set, to the PCI switch, the first access path comprising a first virtual bridge coupling the interface of the active server and a first virtual switch with each other, and a second virtual bridge coupling the I/O device and the first virtual switch with each other; and set, to the PCI switch, a second access path comprising a third virtual bridge coupling the interface of the standby server and a second virtual switch with each other, and a fourth virtual bridge coupling the I/O device and the second virtual switch with each other, and disable mapping between the I/O device and the fourth virtual bridge of the second access path; and the host management block instructs, after the second access path is set, the standby server to make access to the fourth virtual bridge coupled to the I/O device.

Therefore, according to this invention, it is possible to recognize, for the I/O device in use by a active server, presence/absence of a failure in an access path from a standby server to a virtual bridge immediately before the I/O device. When the standby server takes over the active server, it is possible to detect, in advance, a failure in the access path of the standby server, thereby preventing a failure at the time of failover to the standby server, resulting in an increase in reliability of the computer system.

BRIEF DESCRIPTION OF THE DRAWINGS

FIG. 3 shows a first embodiment of this invention, is an example of the port management table of the PCI manager.

FIG. 4 shows a first embodiment of this invention, is an example of the resource assignment table of the PCI manager.

FIG. 5 shows a first embodiment of this invention, is an example of the host management table managed by the host management block.

FIG. 6 shows a first embodiment of this invention, is an example of the virtual switch management table 450 and the virtual bridge management table.

FIG. 10 shows a first embodiment of this invention, is a port management table of the PCI switch.

FIG. 11 shows a first embodiment of this invention, is a virtual switch management table and a virtual bridge management table of the PCI switch.

FIG. 12 shows a first embodiment of this invention, is a virtual switch management table and a virtual bridge management table of the PCI switch.

FIG. 15 shows a first embodiment of this invention, is an example of the standby hosts accessibility check table 470 managed by the host management block.

FIG. 16 shows a first embodiment of this invention, is an example of the standby hosts accessibility matrix managed by the host management block of the PCI manager.

FIG. 21 shows a first embodiment of this invention, is a block diagram illustrating an example of virtual switches 350-X and virtual bridges 360-Y, in which when the standby server 110e takes over the active server 100a.

DETAILED DESCRIPTION OF THE PREFERRED EMBODIMENTS

A description is now given of embodiments of this invention with reference to accompanying drawings.

First Embodiment

Figure 1:
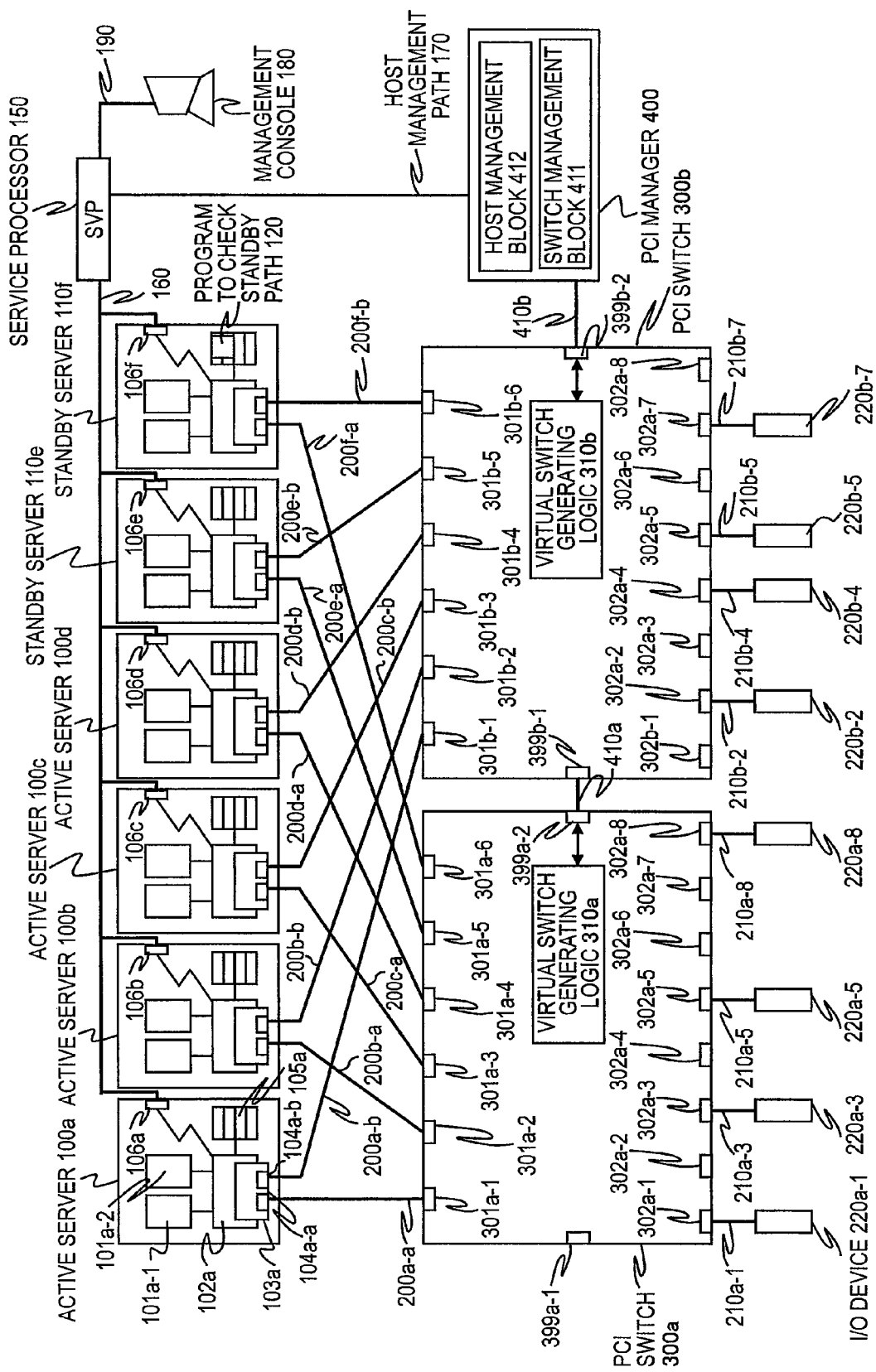
FIG. 1 shows a first embodiment of this invention, and is a block diagram of a computer system to which this invention is applied.

FIG. 1 illustrates a first embodiment, and is a block diagram of a computer system to which this invention is applied. The computer system includes active servers 100a to 100d for carrying out application tasks, standby servers 110e and 110f for taking over the application tasks upon a failure in any of the active servers 100a to 100d, I/O devices 220a-1 to 220a-8 and 220b-2 to 220b-7 used by the servers, PCI switches 300a and 300b for coupling the respective active and standby servers and the respective I/O devices with each other, a PCI manager 400 for managing the PCI switches 300a and 300b, and a service processor 150 for managing the active servers and the standby servers.

The active servers 100a to 100d and the standby servers 110e and 110f have the same configuration, and hence a description is given of the active server 100a, and a description of the other servers is omitted.

The active server 100a includes processors 101a-1 and 101a-2 for carrying out arithmetic and logic operations, a memory 105a for storing data and instructions, a root complex 103a as an interface for communication with the PCI switches 300a and 300b, a chip set 102a for coupling the processors 101a-1 and 101a-2, the memory 105a, and the root complex 103a with each other, and a server management port 106a as an interface for coupling to the service processor 150.

The root complex 103a includes root ports 104a-a and 104a-b as interfaces for coupling respectively to the PCI switches 300a and 300b, and the active server 100a makes access via those root ports 104a-a and 104a-b to the I/O devices 220a-1 to 220a-8 and 220b-2 to 220b-7 coupled respectively to the PCI switches 300a and 300b. It should be noted that, as the I/O devices, conventional HBAs and network interface cards, for example, may be used.

In the following description, the active servers 100a to 100d are generally referred to as active server 100 and the standby servers 110e and 100f are generally referred to as standby server 110. Moreover, the standby state of the standby servers 110 is the cold standby.

<Service Processor>

The service processor 150 is a computer for managing an operation status of the active servers 100 and the standby servers 110, assignment of application tasks, and takeover of application tasks from the active server 100 to the standby server 110, and includes a management console 180 for inputting/outputting information. The computer system according to this invention forms a cluster system for preventing application tasks from being stopped by a failure in the active servers 100 and the standby servers 110. The service processor 150 includes a processor and a memory (not shown), and is coupled to the active servers 100 and the standby servers 110 via a host control path (network) 160. Moreover, the service processor 150 is coupled to the PCI manager 400 via a host management path 170 (second network) to the PCI manager 400.

The service processor 150 monitors an operation status of the active servers 100, and, when the active server 100 fails, instructs the standby server 110e or 110f to take over application tasks (failover). During this failover, the service processor 150, as described later, makes an inquiry to the PCI manager 400 about which standby server 110 can take over the failed active server 100. Then, the service processor 150, based on a response received from the PCI manager 400, determines a standby server 110 which takes over the application tasks of the active server 100, and instructs the standby server 110 to take over the application tasks. For the detection of a failure and the failover processing, publicly known or widely know methods may be employed, and thus detailed description thereof is omitted.

<PCI Switch>

The PCI switches 300a and 300b are constructed by a multi-root PCI switch compliant with the PCIexpress standard as in the above-mentioned conventional example, and couple the plurality of active and standby servers 100 and 110, and the plurality of I/O devices 220a-1 to 220a-8 and 220b-2 to 220b-7 with each other. In the following description, the I/O devices 220a-1 to 220a-8, and 220b-2 to 220b-7 are generally referred to as I/O device 220. The PCI switches 300a and 330b have the same configuration, and hence a description is given only of the PCI switch 300a, and the description of the PCI switch 300b is omitted. According to this embodiment, the root ports of the active servers 100 and the standby servers 110 are respectively coupled to the two PCI switches 300a and 300b.

The PCI switch 300a includes upstream ports 301a-1 to 301a-6 coupled to the root ports of the active servers 100 and the standby servers 110, downstream ports 302a-1 to 302a-6 coupled to the I/O devices 220, and a virtual switch generating logic 310a for setting access paths between the upstream ports 301a-1 to 301a-6 and the downstream ports 302a-1 to 302a-6. In the following description, the upstream ports 301a-1 to 301a-6 are generally referred to as upstream port 301, and the downstream ports 302a-1 to 302a-6 are generally referred to as downstream port 302.

The virtual switch generating logic 310a, as described later, according to an instruction given by the PCI manager 400, sets an access path (virtual path) between the upstream port 301 and the downstream port 302. Therefore, the virtual switch generating logic 310a contains a controller provided with management tables described later.

The PCI switches 300a and 300b respectively include switch management ports 399a-1 and 399a-2, and switch management ports 399b-1 and 399b-2 for coupling to the PCI manager 400. In the PCI switches 300a and 300b, a pair of the switch management ports 399a-1 and 399a-2, and a pair of switch management ports 399b-1 and 399b-2 are respectively coupled with each other, and, by coupling those switch management ports between the PCI switches 300a and 300b, a plurality of PCI switches are coupled as a daisy chain. In FIG. 1, a switch management path 410 couples the switch management port 399b-2 of the PCI switch 300b to the PCI manager 400, the PCI switches 300b and 300a are coupled via the switch management ports 399b-1 and 399a-2, and the PCI switch 300a is coupled via the PCI switch 300b to the PCI manager 400 for communication therewith.

The PCI switch 300a couples between the upstream port 301 and the downstream port 302 via a virtual path for carrying out communication by a virtual switch and virtual bridges. The virtual bridge can couple a physical upstream port 301 or downstream port 302 to a virtual switch VS, or can couple virtual switches with each other. This virtual path is dynamically changed by the virtual switch generating logic 310, and, when the PCI manager 400 instructs the PCI switch 300a to set a virtual switch VS, the virtual switch VS which is an access path between an upstream port 301 and a downstream port 302 can be arbitrarily set. A detailed description is later given of the virtual switch generating logic 310.

<PCI Manager>

The PCI manager 400 is constructed by a computer including a processor and a memory (not shown), and functions as a switch management computer for managing the configurations of the PCI switches 300a and 300b. The PCI manager 400 includes a switch management block 411 for managing, according to an instruction received via the host management path 170 from the management console 180 of the service processor 150, access paths (virtual paths) between the upstream ports and the downstream ports of the PCI switches 300a and 300b, and a host management block 412 for acquiring information on the active servers 100 and the standby servers 110 from the service processor 150, managing the operation statuses of the active servers 100 and the standby servers 110, and monitoring statuses of access paths to the I/O devices 220 to be taken over by the standby servers 110.

The PCI manager 400 identifies, based on tables described later, active servers 100 and standby servers 110, thereby identifying I/O devices 220 used by the active servers 100. Assignment of an I/O device 220 to an active server 100 is specified in advance from the management console 180 coupled to the service processor 150 by an administrator or the like.

On this occasion, the PCI manager 400 according to this invention, at a predetermined timing (every 24 hours, for example), for the I/O devices 220 being used by the active servers 100, sets virtual paths (virtual switches) as access paths when a standby server 110 takes over the I/O devices 220 upon failure, and causes the standby server 110e or 110f to execute a program to check standby path 120, thereby detecting presence/absence of a failure on virtual paths from the standby server 110 to locations immediately before the coupling to the I/O devices 220. Then, the PCI manager 400 stores a result of the execution of the program to check standby path 120 executed by the standby server 110e or 110f in tables described later, and prohibits standby servers 110 for which a failure has been detected from taking over an active server 100. Moreover, when the program to check standby path 120 has detected a failure in a virtual path or a virtual switch, the PCI manger 400 reports the failure on the standby path to the management console 180 of the service processor 150. A detailed description is now given of the PCI manager 400.

Figure 2:
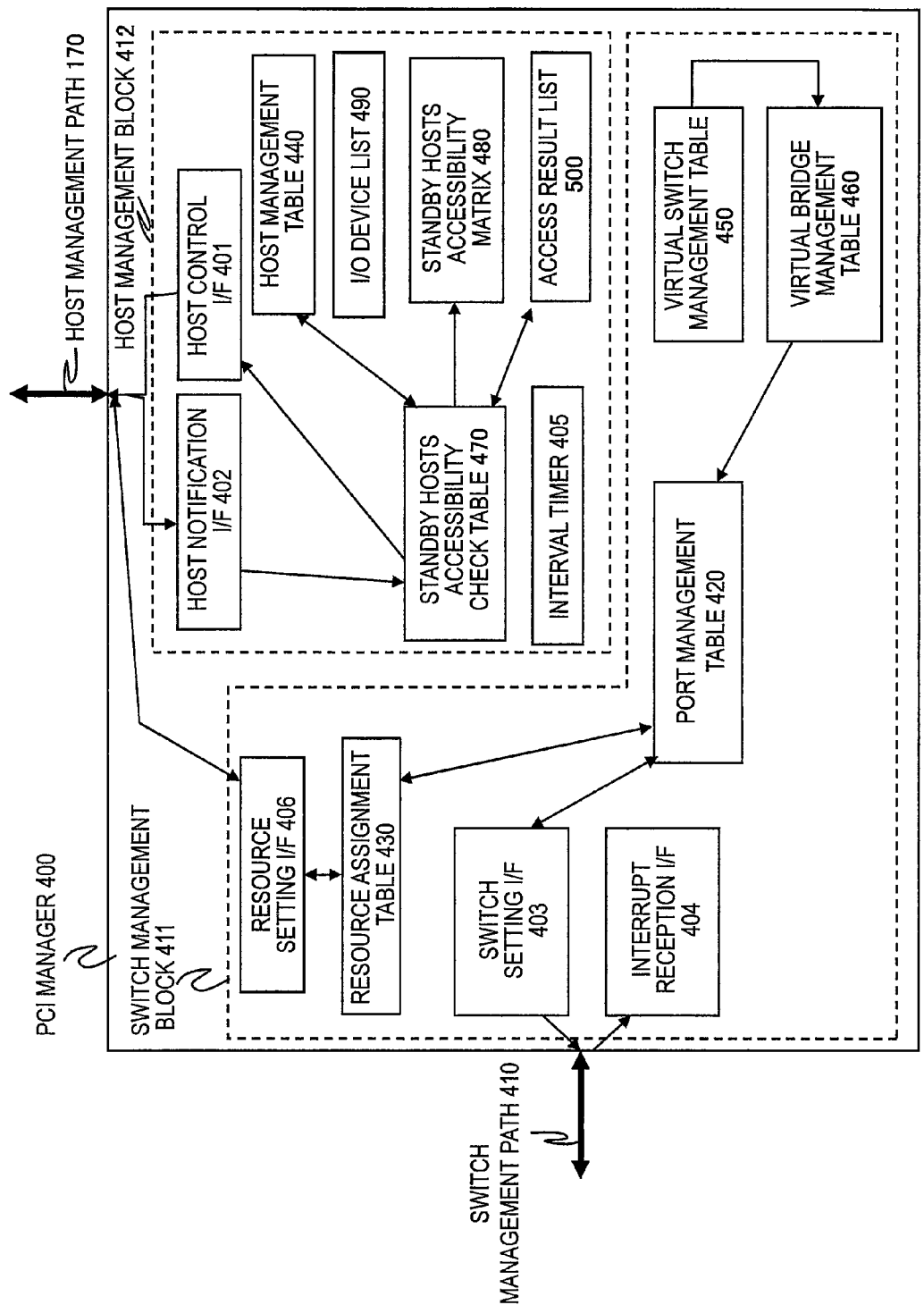
FIG. 2 shows a first embodiment of this invention, is a block diagram illustrating functional elements of the PCI manager.

FIG. 2 is a block diagram illustrating functional elements of the PCI manager 400.

The PCI manager 400 includes the switch management block 411 for managing, via the switch management path 410, the access paths between the upstream ports and the downstream ports of the PCI switches 300a and 300b, and the host management block 412 for acquiring, via the host management path 170, the operation statuses of the active servers 100 and the standby servers 110 from the service processor 150, and monitoring whether or not a failure is present in the I/O devices 220 to be taken over by the standby servers 110.

First, the switch management block 411 includes a resource setting interface 406 for receiving assignments of resources via the service processor 150 from the management console 180. The resource setting interface 406 receives relationships of the I/O devices 220 assigned to the active servers 100 (or standby servers 110) via the service processor 150 from the management console 180. The switch management block 411 stores the assignments between the servers and the I/O devices 220 received from the service processor 150 in a resource assignment table 430 illustrated in FIG. 4.

FIG. 4 describes an example of the resource assignment table 430 of the PCI manager 400. The switch management block 411 stores, for respective identifiers 431 of the PCI switch 300a, one entry constructed by an identifier 432 of an I/O device 220 and an identifier 433 of a server (host) in the resource assignment table 430.

The switch management block 411 receives a new assignment between a server and an I/O device 220 via the resource setting interface 406, updates the resource assignment table 430, then updates a port management table 420, and instructs the PCI switch 300a or 300b to set an updated access path. It should be noted that updates of the resource assignment table 430 and the port management table 420 may be acquired by the resource setting interface 406 at a predetermined timing from the service processor 150.

The port management table 420 manages identifiers of the servers coupled to the upstream ports 301 of the respective PCI switches 300a and 300b, identifiers of the I/O devices 220 coupled to the downstream ports 302, and types (host, device, and PCI switch) of a destination of the coupling.

FIG. 3 describes an example of the port management table 420 of the PCI manager 400. In FIG. 3, in a switch 421, an identifier of the PCI switch 300a or 300b is stored. In a port# 422, an identifier of the upstream port 301 or the downstream port 302 is stored. In a direction 423, "up" is set for an upstream port 301 coupled to the active server 100 or the standby server 110, and "down" is set for a downstream port 302. In a type 424, "HOST" is set when a coupling destination is a server, "DEVICE" is set when the coupling destination is an I/O device 220, and "SWITCH" is set when the coupling destination is a PCI switch. In a link destination 425, an identifier of a coupling destination is stored.

In the port management table 420, an administrator or the like can set, from the management console 180 of the service processor 150, the type, the identifier, and the like of a device coupled to the respective port#'s 422 of the switch 421. Alternatively, the switch management block 411 may acquire a result of monitoring the coupling destinations for the respective ports carried out by the PCI switches 300a and 300b, and may reflect the result to the port management table 420.

The switch management block 411, for the coupling destinations of the upstream ports 301 and the downstream ports 302 set in the port management table 420, sets virtual switches VS and virtual bridges VB so that the relationships between the hosts 433 and the I/O devices 432 set in the resource assignment table 430 are realized, and instructs, from the switch setting interface 403 illustrated in FIG. 2, the PCI switch 300a or 300b to set the virtual switches VS and the virtual bridges VB. On this occasion, the switch management block 411, as illustrated in FIG. 6, updates a virtual switch management table 450 and a virtual bridge management table 460.

FIG. 6 describes examples of the virtual switch management table 450 and the virtual bridge management table 460. FIG. 6 illustrates an example in which the PCI switches 300a and 300b respectively include five virtual switches VS and twelve virtual bridges, and the PCI switches 300a and 300b transfer data between virtual bridges assigned to a virtual switch VS specified by the PCI manager 400.

In the virtual switch management table 450 illustrated in FIG. 6, which entry in the virtual bridge management table 460 is assigned to the respective virtual switches VS of the PCI switches 300a and 300b is set, and whether or not transfer of data is enabled for the respective virtual switches VS is determined. The entry is set for the respective virtual switches VS of the PCI switches 300a and 300b.

Figure 7:
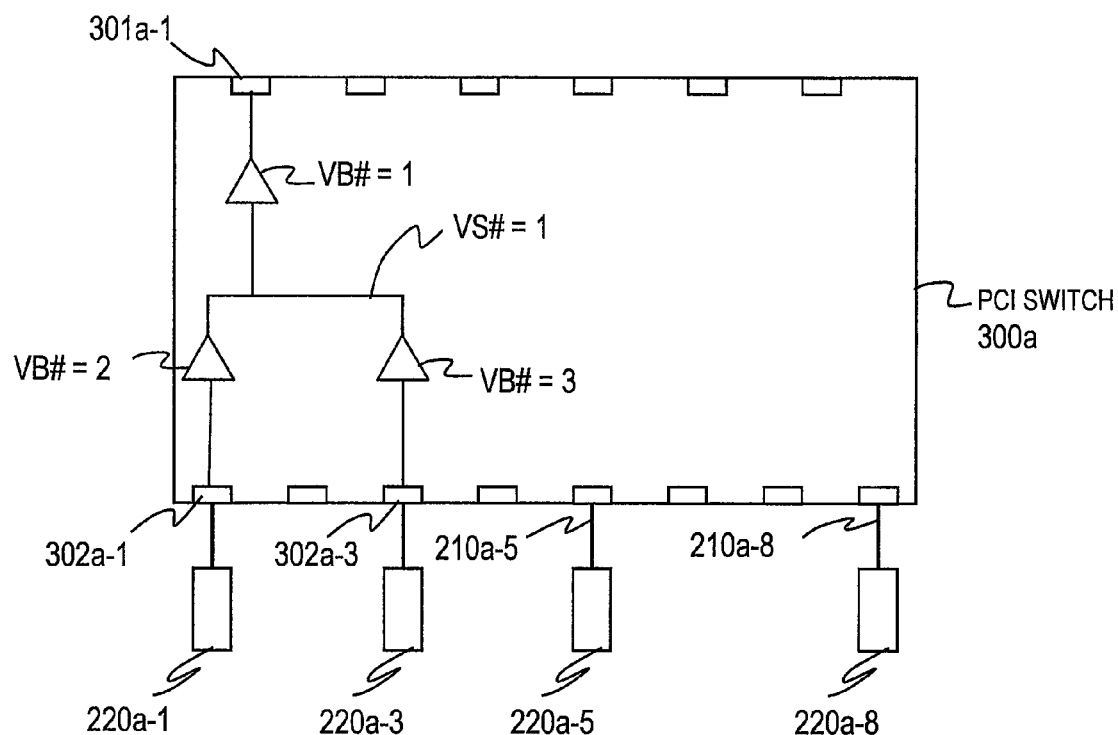
FIG. 7 shows a first embodiment of this invention, is a block diagram illustrating a part of a virtual switch having the VS# of 1 of the PCI switch.

On this occasion, relationships between the virtual switches VS and the virtual bridges VB are illustrated in FIG. 7. FIG. 7 is a block diagram illustrating a part of a virtual switch having the VS# of 1 of the PCI switch 300a. To the upstream port 301a-1 of the PCI switch 300a, the virtual bridge having the VB# of 1 is assigned, to the downstream port 302a-1, a virtual bridge having the VB# of 2 is assigned, and to the downstream port 302a-3, a virtual bridge having the VB# of 3 is assigned. Then, the virtual bridges having the VB#'s of 1, 2, and 3 are assigned to the virtual switch having the VS# of 1. The virtual switch having the VS# of 1, according to the standard for the multi-root switch of the PCIexpress, transfers data (packets) received from the virtual bridge having the VB# of 1 to the virtual bridge having the VB# of 2 or 3, and data received from the virtual bridge having the VB# of 2 or 3 to the virtual bridge having the VB# of 1.

In other words, between the upstream port 301a-1 and the downstream ports 302a-1 and 302a-3 coupled by the virtual switch having the VS# of 1, a virtual path passing through the virtual bridge having the VB# of 2 and a virtual path passing through the virtual bridge having the VB# of 3 are generated, and the virtual switch having the VS# of 1 can switch between these virtual paths according to a destination of a received packet. It is only necessary for the switching operation of the virtual switch having the VS# of 1 to comply with the standard for the multi-root switch of the PCIexpress, and the switching operation is described in no more detail.

The switch management block 411, based on the port management table 420 and the resource assignment table 430, generates the virtual switch management table 450 and the virtual bridge management table 460, and generates, based on these tables, virtual paths constructed by the virtual switches VS. The virtual switch management table 450 illustrated in FIG. 6 contains switches 451 each for storing an identifier of a PCI switch, VS#'s 452 each for storing an identifier of a virtual switch, enabled status flags 453 each indicating whether the data transfer by the virtual switch is enabled or disabled, start VB#'s 454 each for storing a start location of the virtual bridge assigned to the virtual switch on the virtual bridge management table 460, and the numbers of entries 455 each indicating the number of virtual bridges assigned to the virtual switch on the virtual bridge management table 460.

To the VS# 452, which is an identifier of a virtual switch, a unique value among all the virtual switches in the PCI switches 300a and 300b managed by the switch management block 411 is assigned.

Then, the virtual bridge management table 460 contains switches 461 each for storing an identifier of a PCI switch, VB#'s 462 each for storing an identifier of a virtual bridge, enabled status flags 463 each indicating whether data transfer on the virtual bridge is enabled or disabled, directions 464 each indicating whether the virtual bridge is on the upstream port 301 side or on the downstream port 302 side, maps 465 each for setting whether or not mapping from the virtual bridge to the port is enabled, and port#'s 466 each for storing an identifier of the upstream port 301 or downstream port 302 assigned to the virtual bridge.

To the VB# 462, which is an identifier of a virtual bridge, a unique value among all the virtual bridges in the PCI switches 300a and 300b managed by the switch management block 411 is assigned.

For example, it is indicated that, to a virtual switch having the VS# of 1 in the virtual switch management table 450 of FIG. 6, virtual bridges having VB#'s of "1" to "3" in the virtual bridge management table 460 are assigned because a number of entries 455 is "3". Then, the virtual bridge management table 460 indicates that the virtual bridge having the VB# of 1 is assigned to the upstream port 301a-1 of the PCI switch 300a, the virtual bridge having the VB# of 2 is assigned to the downstream port 302a-1 of the PCI switch 300a, the virtual bridge having the VB# of 3 is assigned to the downstream port 302a-3 of the PCI switch 300a, and the data transfer on those virtual bridges are enabled. These settings represent the relationships illustrated in FIG. 7 between the virtual switch having the VS# of 1 and the virtual bridges having the VB#'s of 1 to 3. Virtual switches starting from the virtual switch having the VS# of 2, and virtual bridges starting from the virtual bridge having the VB# of 4, which are not illustrated in the drawing, are also arranged as illustrated in FIG. 7 according to the virtual switch management table 450 and the virtual bridge management table 460 illustrated in FIG. 6.

To a map 465, when a corresponding enabled status flag 463 is "Yes", which indicates that mapping is enabled on a corresponding virtual bridge, and when mapping through an upstream port 301 or a downstream port 302 assigned to a port indicated by a port# 466 is enabled, "Yes" is set, and when the mapping is inhibited (or disabled), "No" is set. When the map 465 is set to "No", a value of a register (not shown), of this virtual bridge can be read. In other words, by assigning a downstream port 302 coupled to an I/O device 220 to the port indicated by the port# 466 of the bridge, by setting "No" to the map 465, and by setting "Yes" to the enabled status flag 463, without making access to the I/O device 220, it is possible to detect the state of an access path immediately before the I/O device 220.

The switch management block 411 generates, as described above, the virtual switch management table 450 and the virtual bridge management table 460, assigns the virtual bridges VB to the virtual switches VS in the PCI switches 300a and 300b, and determines access paths between active servers 100 (or standby servers 110) and I/O devices 220. Then, the switch management block 411, via the switch setting interface 403, instructs the PCI switches 300a and 300b to set the determined access paths. With this instruction, the port management table 420, the virtual bridge management table 460, and the virtual switch management table 450 are transmitted for identifiers of the respective switches.

The switch management block 411 includes the switch setting interface 403 for instructing the PCI switches 300a and 300b to set the virtual switches VS and the virtual bridges VB as well as an interrupt reception interface 404 for receiving an interrupt signal from the PCI switches 300a and 300b, and carrying out predetermined processing.

A description is now given of the host management block 412 of the PCI manager 400. The host management block 412 monitors, on a predetermined timing, states of access paths to I/O devices 220 to be taken over by standby servers 110, and, when an abnormality occurs on the access path, notifies the service processor 150 of the occurrence of the abnormality, thereby causing the management console 180 to output the occurrence of the abnormality.

The host management block 412 includes a host notification interface 402 for acquiring, via the host management path 170 from the service processor 150, information on the active servers 100 and the standby servers 110, and a result of checking access paths, a host control interface 401 for instructing, on the predetermined timing, the standby servers 110 to carry out the check of the access paths up to I/O devices 220 being used by the active servers 100, a host management table 440 for holding statuses of the active servers 100 and the standby servers 110 acquired from the service processor 150, a standby hosts accessibility check table 470 for holding subjects to be monitored on the access paths and check results, a standby hosts accessibility matrix 480 for holding a list of active servers 100 which can be taken over by the standby servers 110, and an interval timer 405 for notifying the predetermined timing.

The host management block 412 stores the types of the host servers (active servers 100 and standby servers 110) acquired from the service processor 150 in the host management table 440, acquires I/O devices 220 assigned to the active servers 100, and stores the I/O devices 220 in the resource assignment table 430. On the timing for updating the host management table 440 and the resource assignment table 430, the host management block 412 acquires the information on the host servers from the service processor 150 in a predetermined cycle. Alternatively, based on a notification from the service processor 150, the host management block 412 may update the host management table 440.

Moreover, the host management table 440 and the resource assignment table 430 may be updated when the switch management block 411 of the PCI manager 400 updates the resource assignment table 430 and the port management table 420.

FIG. 5 describes an example of the host management table 440 managed by the host management block 412. The host management table 440 contains hosts 441 each for storing an identifier of the host server, and active/standby types 442 each for storing a type indicating whether the host server is an active server or a standby server. In the example illustrated in FIG. 5, corresponding to the configuration of FIG. 1, information on the active servers 100a to 100d and the standby servers 110e and 110f is received from the service processor 150.

Figure 13:
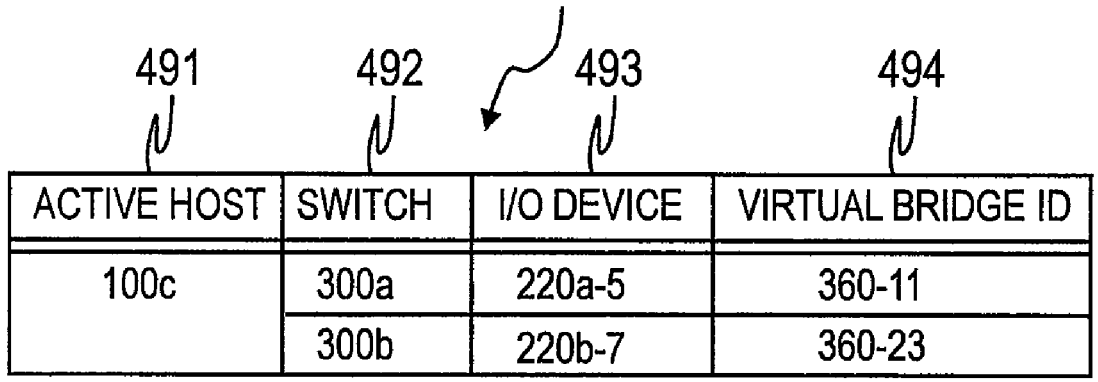
FIG. 13 shows a first embodiment of this invention, is an example of an I/O device list issued by the host management block to the service processor.

FIG. 13 describes an example of an I/O device list 490 issued by the host management block 412 to the service processor 150. The I/O device list 490 contains an active host 491 for storing an identifier of an active server 100, a switch 492 for storing an identifier of a PCI switch 300 to which the active server 100 is coupled, an I/O device 493 for storing an identifier of an I/O device 220 coupled via this PCI switch 300, and a virtual bridge ID 494 for storing an identifier of an access path from the active server 100 to the I/O device 220 in one entry. FIG. 13 illustrates the I/O devices 220 of the active server 100c, and similarly to the other active servers 100a, 100b, and 100d, when a standby server 110 carries out the processing of checking a virtual path, respective I/O device lists 490 are generated by the host management block 412, and are transmitted to the service processor 150. The virtual bridge ID 494 is a unique identifier assigned for an access path from an active server 100 to an I/O device 220 by the PCI manager 400 to a combination between a virtual bridge VB and a virtual switch VS illustrated in FIG. 6.

The host management block 412, when receiving a notification from the interval timer 405 indicating that the predetermined timing has been reached, as described later, for I/O devices 220 in use by an active server 100, sets virtual access paths (virtual paths) from the standby server 110 to the I/O devices 220, and makes a coupling up to locations immediately before the I/O devices 220, which are terminals of the virtual paths. Then, the host management block 412 instructs, via the service processor 150, a standby server 110 to detect whether or not a failure is present in the virtual paths from the standby server 110 to the locations immediately before the I/O devices 220. Then, the standby server 110 transmits, as a result of checking the virtual paths up to the locations immediately before the I/O devices 220, an access result list 500 via the service processor 150 to the host management block 412. The host management block 412 updates, based on the received access result list 500, the standby hosts accessibility check table 470, and the standby hosts accessibility matrix 480 indicating active servers 100 which can be taken over by the standby servers 110. On this occasion, when the host management block 412 detects a failure in the access path from the standby server 110 to the I/O device 220 to be checked, the host management block 412 notifies, via the service processor 150, the management console 180 of the generated failure. The processing of checking a virtual path carried out by the standby server 110 is carried out by the respective standby servers 110 for the respective active servers 100.

Figure 14:
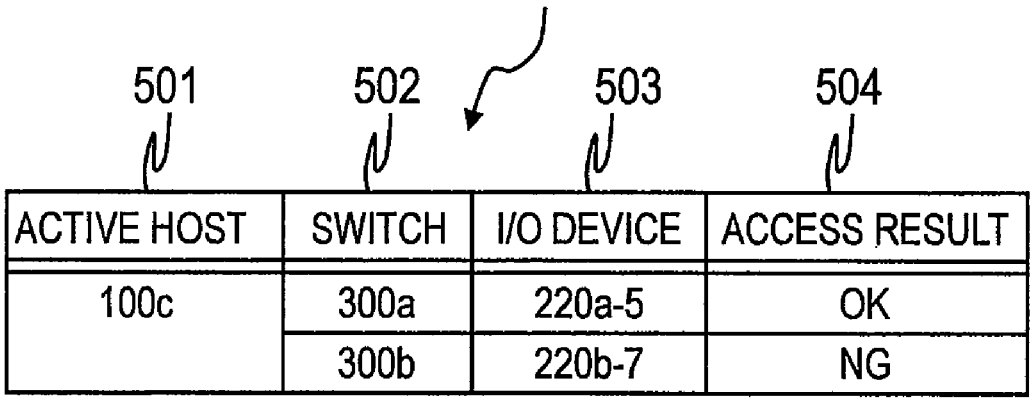
FIG. 14 shows a first embodiment of this invention, is an example of the access result list generated by a standby server as a result of the execution of the program to check standby path.

FIG. 14 describes an example of the access result list 500 generated by a standby server 110 as a result of the execution of the program to check standby path 120. The access result list 500 contains an active host 501 for storing an identifier of an active server 100, a switch 502 for storing an identifier of a PCI switch 300 to which the active server 100 is coupled, an I/O device 503 for storing an identifier of an I/O device 220 coupled via this PCI switch 300, and an access result 504 for storing a result of checking an access path from this standby server 110 up to the I/O device 220 in one entry. FIG. 14 illustrates I/O devices 220 for the active server 100c, and similarly to the other active servers 100a, 100b, and 100d, after a standby server 110 carries out the processing of checking a virtual path, respective access result lists 500 are generated by the standby server 110.

FIG. 15 describes an example of the standby hosts accessibility check table 470 managed by the host management block 412. The standby hosts accessibility check table 470 stores, when a standby server 110 in the host management table 440 takes over the respective active servers 100, whether or not access paths from the respective active servers 100 to the I/O devices 220 are failed. In other words, the standby hosts accessibility check table 470 stores results of monitoring the access paths up to the I/O devices 220 instructed by the host management block 412 to the respective standby servers 110.

In FIG. 15, the standby hosts accessibility check table 470 contains a standby host 471 for storing an identifier of a standby server 110, an active host 472 for storing an identifier of an active server 100 for which a virtual path is checked, a switch 473 for storing an identifier of a PCI switch 300 to which this active host is coupled, an I/O device 474 for storing an identifier of an I/O device 220 to be coupled to the virtual path, and an access result 475 for storing a check result of the virtual path up to a location immediately before the I/O device 220 in one entry.

The active hosts 472, the switches 473, and the I/O devices 474 of FIG. 15 represent the relationships between the active servers 100 and the I/O devices 220 illustrated in FIG. 1, and, for example, the active server 100a uses the I/O devices 220a-1 and 220a-3 of the PCI switch 300a coupled to the root port 104a-a.

FIG. 16 describes an example of the standby hosts accessibility matrix 480 managed by the host management block 412 of the PCI manager 400. The host management block 412, when receiving a result of checking virtual paths up to the I/O devices 220 carried out by the respective standby servers 110, updates the standby hosts accessibility check table 470, and then, updates the standby hosts accessibility matrix 480.

The standby hosts accessibility matrix 480 contains, with respect to a standby host 481 for storing an identifier of a standby server 110, active hosts 482 for storing identifiers of all the active servers 100, and check results 483 indicating whether the respective active servers 100 can be taken over by the standby host 110 in one entry.

The host management block 412 refers to the standby hosts accessibility check table 470. When access results 475 for all I/O devices 474 used by an active host 472 are "OK", the host management block 412 sets the check result 483 in the standby hosts accessibility matrix 480 to "OK". When access results 475 for all I/O devices 474 used by an active host 472 contain "NG", the host management block 412 sets the check result 483 to "NG", which indicates that this standby host 481 cannot supercede the active host 482.

For example, in FIG. 15, when an standby host 471 is "110e", and an active host 472 is "100b", an access result 475 for a virtual path for an I/O device 474 of "220b-4" is "NG", and hence, in the standby hosts accessibility matrix 480, a check result 483 for the standby host 481 of "110e" and the active host 482 of "100b" is "NG", which indicates that the virtual path to the I/O device 220b-4 is failed, and hence the standby server 110e cannot supercede the active server 100b.

The service processor 150, when an active server 100 fails, inquires the host management block 412 of the PCI manager 400 about standby servers 110 which can take over the failed active server 100, and the host management block 412 returns standby hosts 481 which have the check result 483 for the active host 482 corresponding to the failed active server 100 set to "OK" to the service processor 150. As a result, when an active server 100 fails, it is possible to prevent a failed standby server 110 from being selected as a successor, thereby reducing a period in which application tasks are stopped.

<Virtual Switch Generating Logic for PCI Switch>

The PCI switches 300a and 300b, which have received setting for ports, virtual switches VS, and virtual bridges VB from the switch management block 411 of the PCI manger 400, update the respective tables in the virtual switch generating logics 310a and 310b, thereby updating setting of the virtual switches and the virtual bridges, and generating virtual paths. In the following description, the virtual switch generating logics 310a and 310b are generally referred to as virtual switch generating logic 310. Moreover, the PCI switches 300a and 300b are generally referred to as PCI switch 300.

Figure 8:
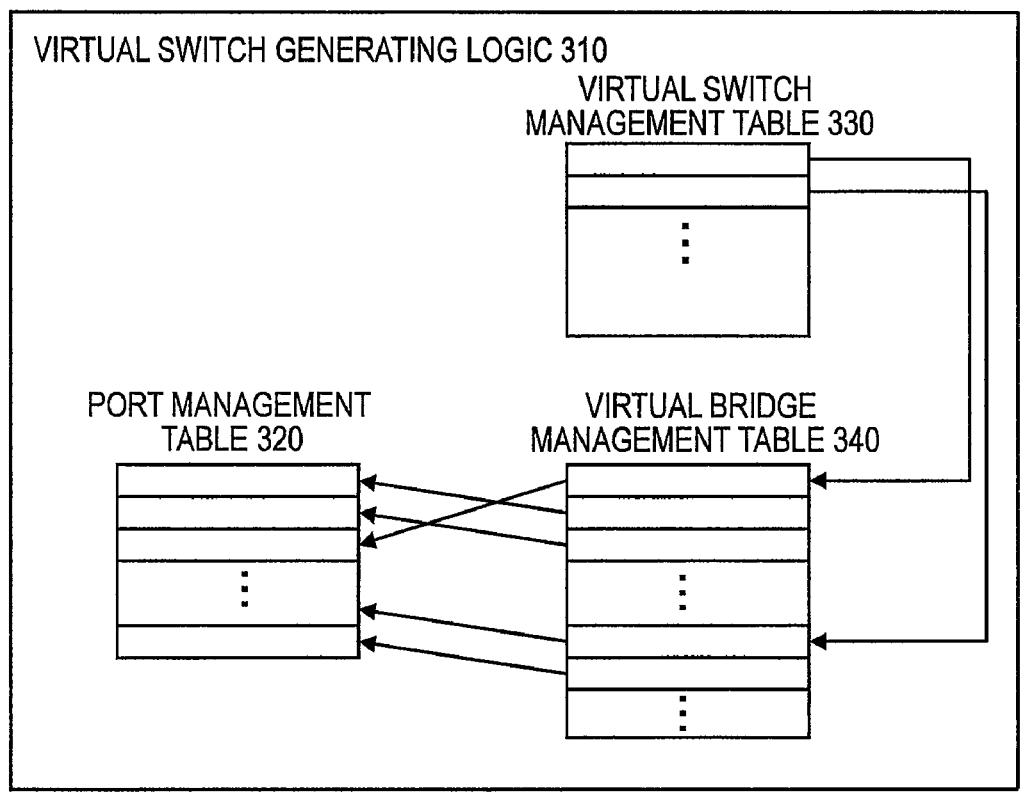
FIG. 8 shows a first embodiment of this invention, is tables managed by the virtual switch generating logic.

The virtual switch generating logic 310 is a control logic provided to the respective PCI switches 300, and FIG. 8 illustrates tables managed by the virtual switch generating logic 310. FIG. 8 is a block diagram illustrating an example of the tables managed by the virtual switch generating logic 310.

The virtual switch generating logic 310 of the PCI switch 300 is provided with, as in the tables managed by the switch management block 411 of the PCI manager 400, a port management table 320, a virtual switch management table 330, and a virtual bridge management table 340. In the following description, tables for the PCI switch 300a are suffixed by "a", and tables for the PCI switch 300b are suffixed by "b".

Figure 9:
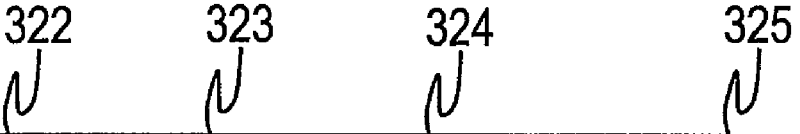
FIG. 9 shows a first embodiment of this invention, is a port management table of the PCI switch.

FIG. 9 illustrates a port management table 320a of the PCI switch 300a. The port management table 320a corresponds to a portion of the port management table 420 of the PCI manager 400 illustrated in FIG. 3, which has an identifier of "300a" in the switch 421, and constructed by entries each containing a port# 322, a direction 323, a type 324, and a link destination 325.

FIG. 10 illustrates a port management table 320b of the PCI switch 300b. The port management table 320b corresponds to a portion of the port management table 420 of the PCI manager 400 illustrated in FIG. 3, which has an identifier of "300b" in the switch 421, and constructed by entries each containing the port# 322, the direction 323, the type 324, and the link destination 325.

FIG. 11 illustrates a virtual switch management table 330a and a virtual bridge management table 340a of the PCI switch 300a. The virtual switch management table 330a corresponds to a portion of the virtual switch management table 450 of the PCI manager 400 illustrated in FIG. 6, which has the identifier of "300a" in the switch 451, and constructed by entries each containing a VS# 332, an enabled status flag, a start VB# 334, and a number of entries 335. The virtual bridge management table 340a corresponds to a portion of the virtual bridge management table 460 of the PCI manager 400 illustrated in FIG. 6, which has the identifier of "300a" in the switch 461, and constructed by entries each containing a VS# 342, an enabled status flag 343, a direction 344, a map 345, a port# 346, and a VH# 347.

FIG. 12 illustrates a virtual switch management table 330b and a virtual bridge management table 340b of the PCI switch 300b. The virtual switch management table 330b corresponds to a portion of the virtual switch management table 450 of the PCI manager 400 illustrated in FIG. 6, which has the identifier of "300b" in the switch 451, and constructed by entries each containing the VS# 332, the enabled status flag 333, the start VB# 334, and the number of entries 335. The virtual bridge management table 340b corresponds to a portion of the virtual bridge management table 460 of the PCI manager 400 illustrated in FIG. 6, which has the identifier of "300b" in the switch 461, and constructed by entries each containing the VS# 342, the enabled status flag 343, the direction 344, the map 345, the port# 346, and the VH# 347.

The contents of the tables managed by the virtual switch generating logics 310 of the respective PCI switches 300a and 300b illustrated in FIGS. 9 to 12 coincide with the contents of the respective tables managed by the switch management block 411 of the PCI manager 400 illustrated in FIGS. 3 and 6.

Figure 17:
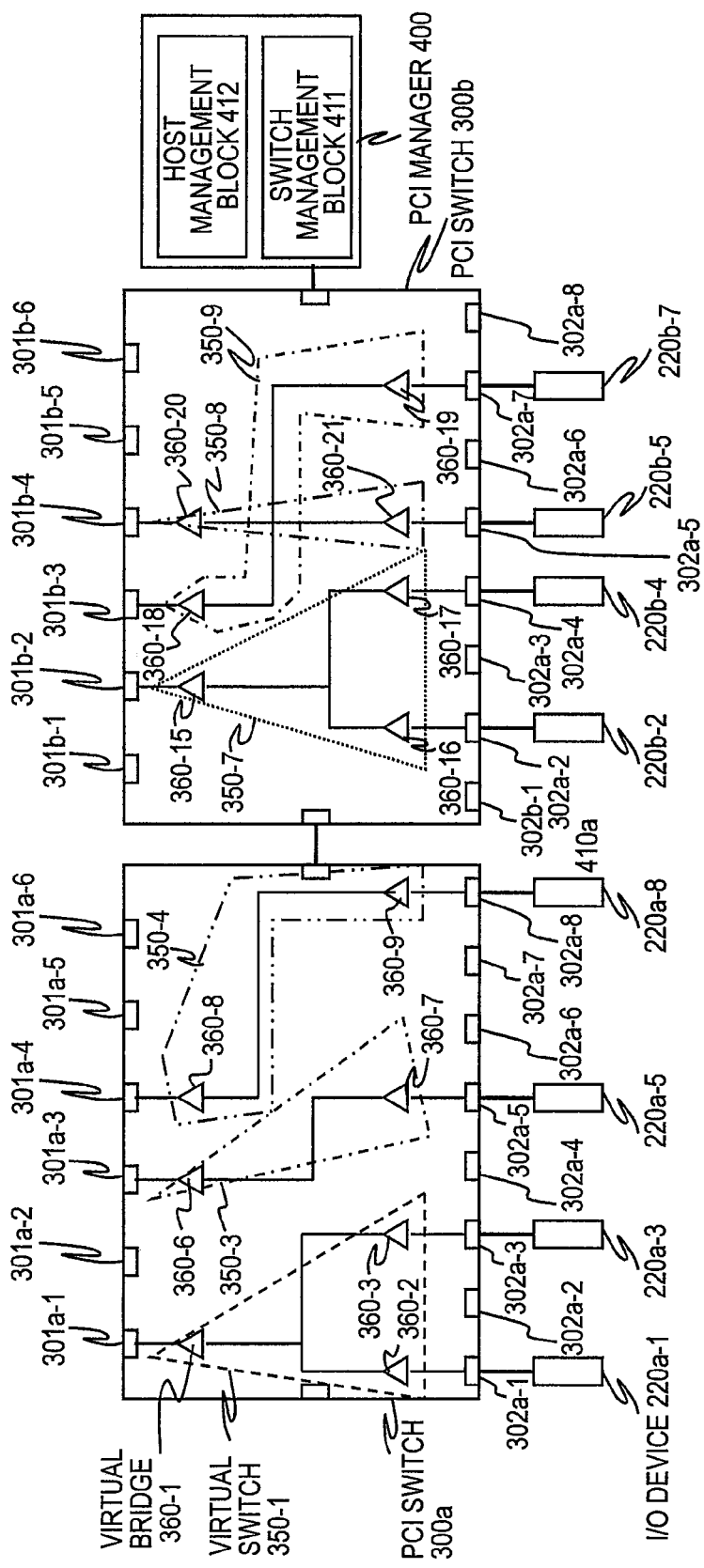
FIG. 17 shows a first embodiment of this invention, is a block diagram illustrating an example of virtual switches set in the PCI switches 300a and 300b.

FIG. 17 is a block diagram illustrating an example of virtual switches set in the PCI switches 300a and 300b when the PCI manager 400 has given an instruction to the PCI switches 300a and 300b based on the port management table 420 illustrated in FIG. 3, and the virtual switch management table 450 and the virtual bridge management table 460 illustrated in FIG. 6.

In FIG. 17, a virtual switch 350-1 is constructed by a virtual bridge 360-1 assigned to an upstream port 301a-1, a virtual bridge 360-2 assigned to a downstream port 302a-1, and a virtual bridge 360-3 assigned to a downstream port 302a-3. The virtual switch 350-1 switches virtual paths coupling an active server 100a coupled to the upstream port 301a-1 to an I/O device 220a-1 of the downstream port 302a-1 or an I/O device 220a-3 of the downstream port 302a-3. Specifically, based on the port management table 420 illustrated in FIG. 3, and the resource assignment table 430 illustrated in FIG. 4, the PCI manager 400 sets the virtual paths for the I/O devices 220a-1 and 220a-3 used by the active server 100a as illustrated in the virtual switch management table 450 and the virtual bridge management table 460 illustrated in FIG. 6.

A suffix X of a virtual switch 350-X illustrated in FIG. 17 represents an identifier of a virtual switch in a VS# 452 in the virtual switch management table 450 illustrated in FIG. 6, and a suffix Y of a virtual bridge 360-Y represents an identifier of a virtual bridge in a VB# 462 in the virtual bridge management table 460 illustrated in FIG. 6.

FIG. 17 illustrates a state in which, according to the instruction from the PCI manager 400, the virtual switch generating logics 310 of the PCI switches 300a and 300b respectively have generated virtual switches 350-1 to 350-9. A virtual bridge 360-Y is constructed by a register, for example, and the virtual switch 350-X switches assigned virtual bridges 360-Y for transferring packets. When two virtual bridges 360-Y are assigned to the virtual switch 350-X, packets are transferred between the two virtual bridges 360-Y.

<Processing for Checking Virtual Path from Standby Servers>

Figure 18:
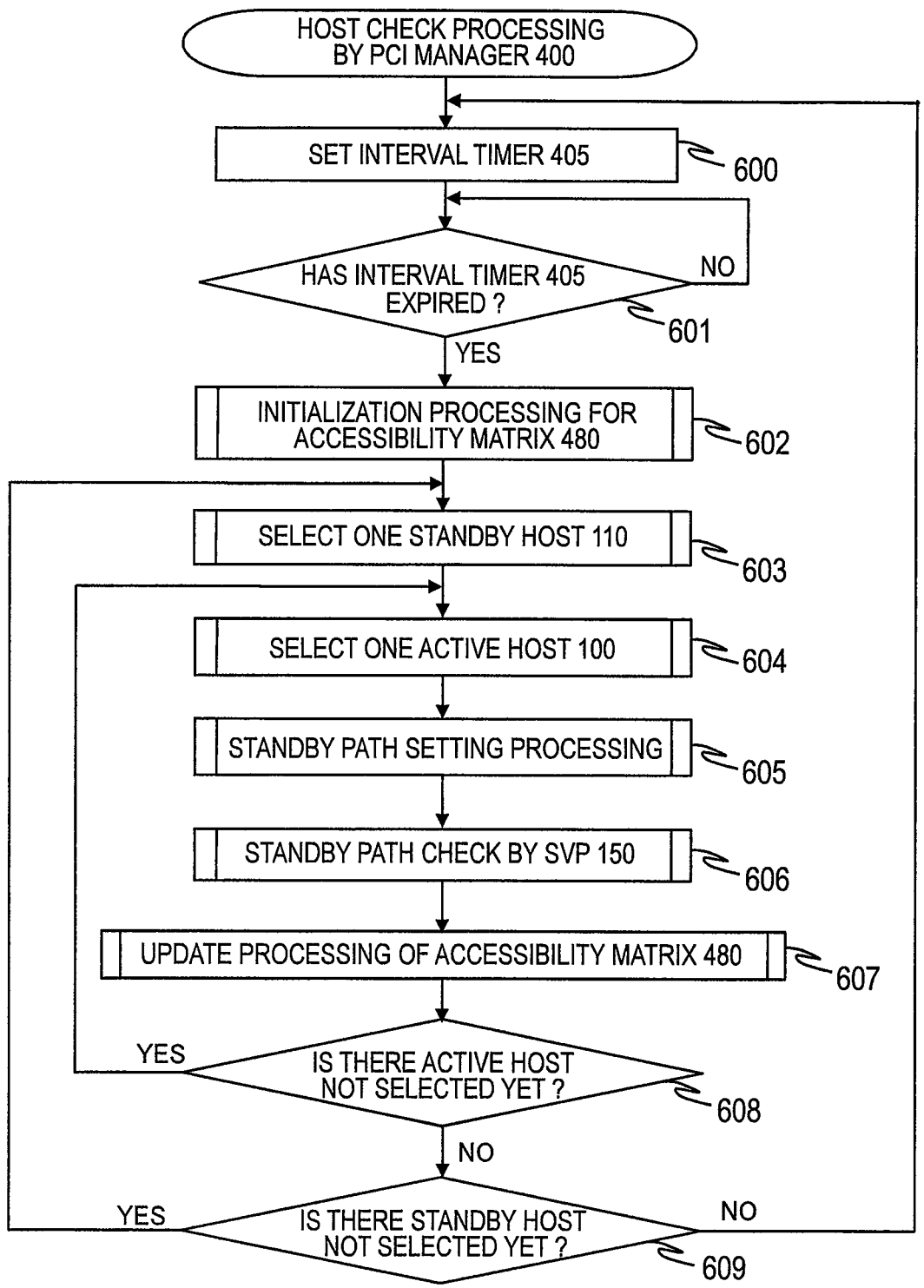
FIG. 18 shows a first embodiment of this invention, is a flowchart illustrating an example of the processing carried out by the host management block of the PCI manager for checking virtual paths from a standby server.

Referring to FIG. 18, a description is now given of the processing carried out by the host management block 412 of the PCI manager 400 for checking virtual paths from a standby server 110 up to I/O devices 220. FIG. 18 is a flowchart illustrating an example of the processing carried out by the host management block 412 of the PCI manager 400 for checking virtual paths from a standby server 110.

The host management block 412 first sets, in a step 600, a predetermined time period or a cycle to the interval timer 405. It should be noted that the time period set to the interval timer 405 may be properly set according to an operation status of or a load on an active server 100, such as 24 hours. The host management block 412 determines, in a step 601, whether or not the interval timer 405 has counted the above-mentioned time period, and waits until the interval timer 405 counts the predetermined time period. When the interval timer 405 has counted the predetermined time period, the host management block 412 proceeds to a step 602, and detects a failure in virtual paths up to locations immediately before I/O devices 220 for a case in which standby servers 110 takes over the active server 100. On this occasion, the virtual path up to the location immediately before the I/O device 220 is, in FIG. 17, an access path from the standby server 110 to a virtual bridge 360-Y assigned to a downstream port 302 coupled to the I/O device 220.

In the step 602, the host management block 412 initializes the standby hosts accessibility matrix 480. In this initialization, the host management block 412 acquires identifiers of active and standby servers stored in the host 441 of the host management table 440, sets the identifiers, according to the type 442, to standby hosts 481 and active hosts 482 of the standby hosts accessibility matrix 480, and clears check results 483. Moreover, the host management block 412 updates the standby hosts accessibility check table 470 according to the contents of the present host management table 440, the resource assignment table 430, and the port management table 420, and clears access results 475.

Then, in a step 603, the host management block 412 selects one standby server 110 from the standby host 481 of the standby hosts accessibility matrix 480, and, in a step 604, the host management block 412 selects one active server 100 from the active host 482 of the standby hosts accessibility matrix 480.

In a step 605, for the standby server 110 and the active server 100 selected respectively in the steps 603 and 604, the host management block 412 refers to the resource assignment table 430, and instructs the switch management block 411 to set virtual paths, for I/O devices 220 that are being used by the active server 100, from the selected standby server 110. The virtual paths from the standby server 110 to the I/O devices 220 in use are set to have the same shape as a path tree from the active server 100 to the I/O devices 220.

Moreover, in order to specify the I/O devices 220 for which the standby server 110 is instructed to check the virtual paths, the host management block 412 generates the I/O device list 490 for the selected active server 100.

The switch management block 411 sets, to the virtual switch management table 450 and the virtual bridge management table 460 illustrated in FIG. 6, the virtual switches and virtual bridges as described above in order to generate the virtual paths from the standby server 110 to the I/O devices 220, and instructs the PCI switches 300 including the ports to which the I/O devices 220 are coupled to generate virtual switches.

On this occasion, in the virtual bridge management table 460 illustrated in FIG. 6, the switch management block 411 sets to "No" the map 465 for a virtual bridge assigned to a downstream port 302 coupled to the I/O device 220 in the virtual path from the standby server 110 to the I/O device 220, thereby inhibiting (disabling) mapping between the virtual bridge and the I/O device 220. As a result, the virtual path extends from the standby server 110 to the location immediately before the I/O device 220.

Then, in a step 606, the host management block 412 instructs the service processor 150 to cause the selected standby server 110 to execute the program to check standby path 120 for checking the statuses of the virtual paths to the locations immediately before the I/O devices 220 that are being used by the active server 100, and transmits an I/O device list 490 indicating the active server 100 to be checked. The service processor 150, as described later, based on the I/O device list 490, causes the standby server 110 to execute the program to check standby path 120 for the virtual paths of the PCI switches 300 set by the PCI manager 400. The standby server 110, as described later, returns a result of the check as a result list 500 to the service processor 150. The service processor 150 returns the access result list 500 to the host management block 412.

On this occasion, the standby servers 110 according to this embodiment, are in the cold standby state, and hence, upon the reception of the instruction from the host management block 412 to check the virtual paths, the service processor 150 starts up the standby server 110. When the standby server 110 is started up, the service processor 150 transmits the I/O device list 490, thereby instructing the standby server 110 to start the check, and causing the standby server 110 to execute the program to check standby path 120. The standby server 110, by means of the program to check standby path 120, determines whether or not the virtual path up to the location immediately before the I/O device 220 set to the PCI switch 300 is failed, and transmits a result to the service processor 150. The program to check standby path 120 may be stored in the respective standby servers 110 in advance, or may be loaded from the service processor 150 or the PCI manager 400.

In a step 607, the host management block 412 stores contents of the access result list 500 acquired via the service processor 150 from the standby server 110 in the standby hosts accessibility check table 470, and updates the standby hosts accessibility matrix 480. Then, the host management block 412 instructs the switch management block 411 to delete the virtual paths from the standby server 110 to the locations immediately before the I/O devices 220 for which the check has been finished. The switch management block 411, for the virtual paths about which the instruction has been made by the host management block 412, deletes corresponding path settings from the virtual switch management table 450 and the virtual bridge management table 460, and instructs the PCI switches 300 on which the virtual paths from the standby server 110 are set to delete virtual switches.

In a step 608, the host management block 412 determines whether an active host 482 which has not been selected yet exists in the standby hosts accessibility matrix 480. When there is an active host, which has not been selected, the host management block 412 returns to the step 604, and carries out, for a next active host 482, the processing of checking a virtual path. On the other hand, when the presently selected standby server 110 is the last active server 100, for which the check of the virtual path has not been finished, the host management block 412 proceeds to a step 609.

When the check for virtual path has been completed for one standby server 110, in the step 609, the host management block 412 determines whether a standby host 481 which has not been selected yet exists in the standby hosts accessibility matrix 480. When there is an active host, which has not been selected, the host management block 412 returns to the step 603, and carries out, for a next standby host 481, the processing of checking a virtual path. On the other hand, when all the standby servers 110 have checked the virtual path for all the active servers 100, the host management block 412 returns to the step 600, and waits until the next processing. On this occasion, the host management block 412 may instruct the service processor 150 to bring the standby servers 110 into the cold standby state.

As a result of the above-mentioned processing, the PCI manager 400 determines whether or not the access paths from the standby server 110 to the locations immediately before the I/O devices 220 that are being used by the active server 100 are failed. On this occasion, because the standby server 110 makes access along the path up to the virtual bridge 360-Y immediately before the I/O device 220, the active server 100 presently using the I/O device 220 is not influenced. Then, the PCI manager 400, for all the standby servers 110, acquires information concerning whether virtual paths are failed when the respective active servers 100 are taken over, and updates the standby hosts accessibility matrix 480. As a result, before a failure occurs to the active server 100, it is possible to recognize a failure in the access paths up to the locations immediately before the I/O devices 220, and, upon a switch from the active server 100 to the standby server 110, it is possible to prevent another failure caused by inaccessibility to the I/O device 220 from occurring.

Figure 19:
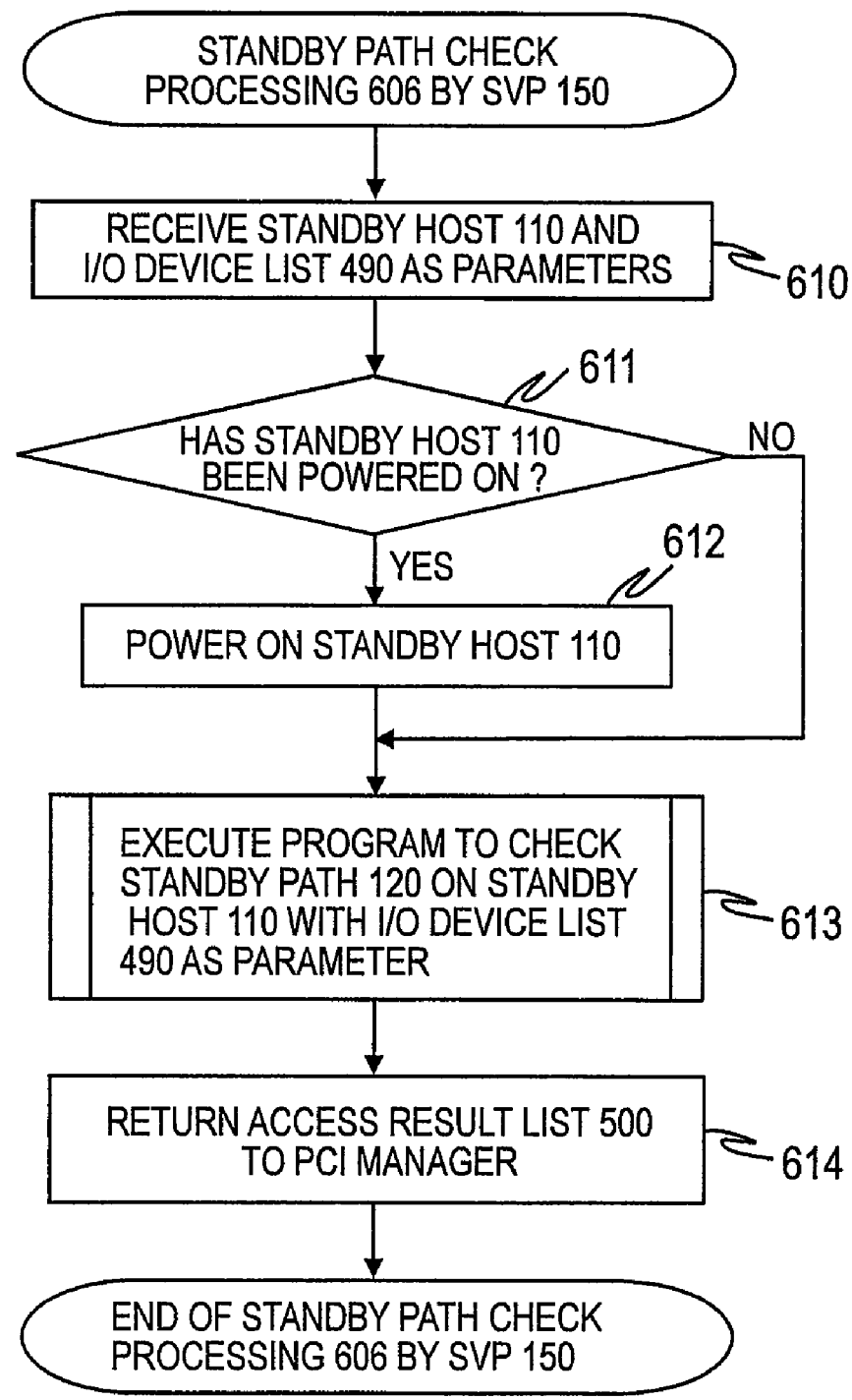
FIG. 19 shows a first embodiment of this invention, is a flowchart illustrating a subroutine of the step 606, and illustrates processing carried out by the service processor.

A detailed description is now given of the processing of the step 606 of FIG. 18. FIG. 19 is a flowchart illustrating a subroutine of the step 606, and illustrates processing carried out by the service processor 150.

This flowchart is executed when the service processor 150 receives, from the host management block 412 of the PCI manager 400, the identifier of the standby server 110 and the instruction to start checking the virtual paths.

In a step 610, the service processor 150 receives, from the host management block 412 of the PCI manager 400, the identifier of the standby server 110 which is instructed to carry out the processing of checking a virtual path, and the I/O device list 490 of the active server 100 to be taken over by the standby server 110 corresponding to this identifier.

In a step 611, the service processor 150 determines whether the standby server 110 specified by the identifier has been started up, and when the standby server 110 has started up, the service processor 150 proceeds to a step 613, and, when the server 110 has not started up, in a step 612, the service processor 150 starts up the subject standby server 110.

In the step 613, the service processor 150 transmits the I/O device list 490 received from the PCI manager 400 to the started-up standby server 110, and causes the standby server 110 to execute the program to check standby path 120. The standby server 110, as described later, for the respective I/O devices 220 to be taken over from the active server 100, causes the program to check standby path 120 to make access to the virtual paths and check whether the virtual paths are failed, generates a result as an access result list 500, and transmits the access result list 500 to the service processor 150.

In a step 614, the service processor 150 receives the access result list 500 from the standby server 110, and transfers it to the PCI manager 400.

As a result of the above-mentioned processing, the service processor 150, after starting up the standby server 110, transmits the I/O device list 490 received from the host management block 412 to the standby server 110, and causes the program to check standby path 120 to check the I/O devices 220 in the I/O device list 490. Then, the service processor 150 returns the access result list 500 received from the standby server 110 to the host management block 412 of the PCI manager 400.

Figure 20:
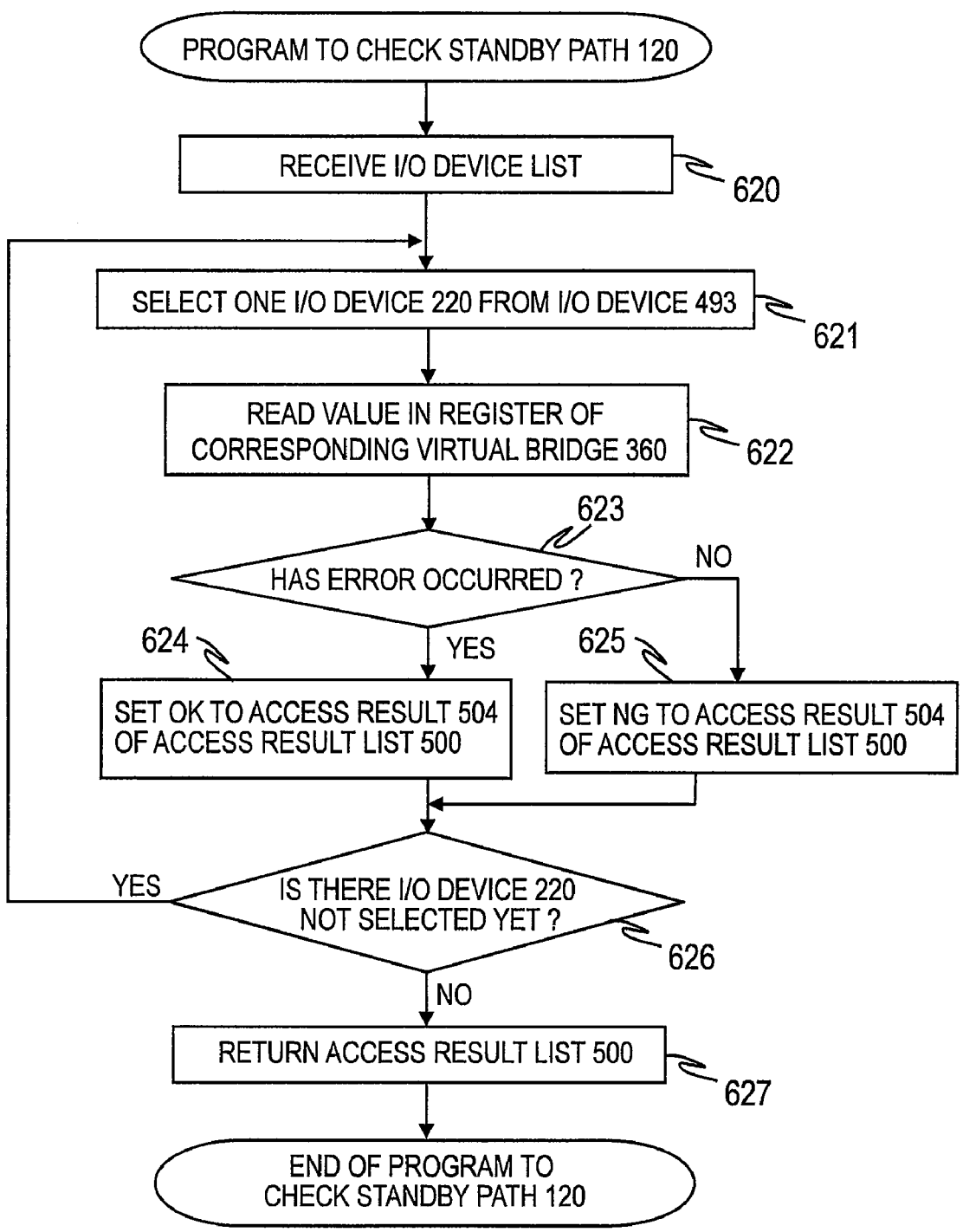
FIG. 20 shows a first embodiment of this invention, is a flowchart illustrating a subroutine of the step 606, and illustrates processing carried out by the standby server in the step 613 of FIG. 19.

Referring to a flowchart of FIG. 20, a description is now given of an example of the processing carried out by the program to check standby path 120 carried out by the standby server 110 in the step 613 of FIG. 19. This flowchart is carried out when the standby server 110 receives the instruction from the service processor 150.

The standby server 110 started by the service processor 150 executes the program to check standby path 120. It should be noted that, for a method for starting up the standby server 110 in the cold standby state, Wake on LAN, a baseboard management controller (BMC), or the like may be used.

In a step 620, the standby server 110 receives the I/O device list 490 from the service processor 150, and, in a step 621, selects one I/O device 220 from the I/O device 493 of the I/O device list 490 illustrated in FIG. 13.

Then, in a step 622, the standby server 110 makes access (such as read access) to the selected I/O device 220. On this occasion, because the PCI manager 400 has already set the virtual path from the standby server 110 up to the location immediately before the I/O device 220 to the PCI switch 300, the standby server 110 reads a value of the register of the virtual bridge 360 immediately before the I/O device 220.

In a step 623, the standby server 110 determines whether the values of the registers of the virtual bridges 360 have been read, and, when the values have been read, the standby server 110 proceeds to a step 624, and, when an error occurs during the read, the standby server 110 proceeds to a step 625. In the step 624, the standby server 110 sets, to the access result 504 in the access result list 500 representing the access result of the I/O device 220, "OK" representing that the virtual path is normal. On the other hand, in the step 625, the standby server 110 sets, to the access result 504 in the access result list 500 of the I/O device 220, "NG" representing that the virtual path is abnormal.

In any one of the step 624 and 625, the standby server 110 generates the access result list 500 for each I/O device 220.

Then, in a step 626, the standby server 110 determines whether, in the I/O device list 490, there is an I/O device 220 to which an access has not been made. When the I/O device list 490 contains an I/O device 220 to which an access has not been made yet, the standby server 110 returns to the step 621, selects a next I/O device 220, and repeats the above-mentioned processing. On the other hand, all the I/O devices 220 in the I/O device list 490 have been accessed, the standby server 110 proceeds to a step 627.

In the step 627, the standby server 110 transmits the generated access result list 500 to the service processor 150, and finishes the processing.

As a result of the above-mentioned processing, when the service processor 150 receives the instruction to start the processing of checking a virtual path and the I/O device list 490 from the PCI manager 400, the service processor 150 starts up the specified standby server 110. Then, the service processor 150 transmits, to the standby server 110, the instruction to execute the program to check standby path 120, and the I/O device list 490. The standby server 110 executes the program to check standby path 120 for checking access paths up to virtual bridges immediately before the respective I/O devices 220 in the I/O device list 490. When the program to check standby path 120 of the standby server 110, for the I/O device 220 in the I/O device list 490, makes access to the access path up to the virtual bridge immediately before the I/O device 220, and reads the value of the register of the virtual bridge of the PCI switch 300, the program to check standby path 120 determines that a result of the access to this virtual path is "OK", and, when the program to check standby path 120 cannot read the value of the register, the program to check standby path 120 determines that the result of the access to this virtual path is "NG". The program to check standby path 120 generates an access result list 500 from all results of the access to the virtual bridge for all the I/O devices 220 stored in the I/O device list 490, and notifies the service processor 150 of the access result list 500. The service processor 150, in this way, causes the standby server 110 to carry out the check processing, and notifies the PCI manager 400 of the access result list 500 indicating the access results for respective I/O devices 220. The host management block 412 of the PCI manager 400 updates, based on the received access result list 500, the standby hosts accessibility check table 470, and the standby hosts accessibility matrix 480, thereby making preparations for takeover of the active server 100.

<Example of Standby Path Check>

Figure 21:
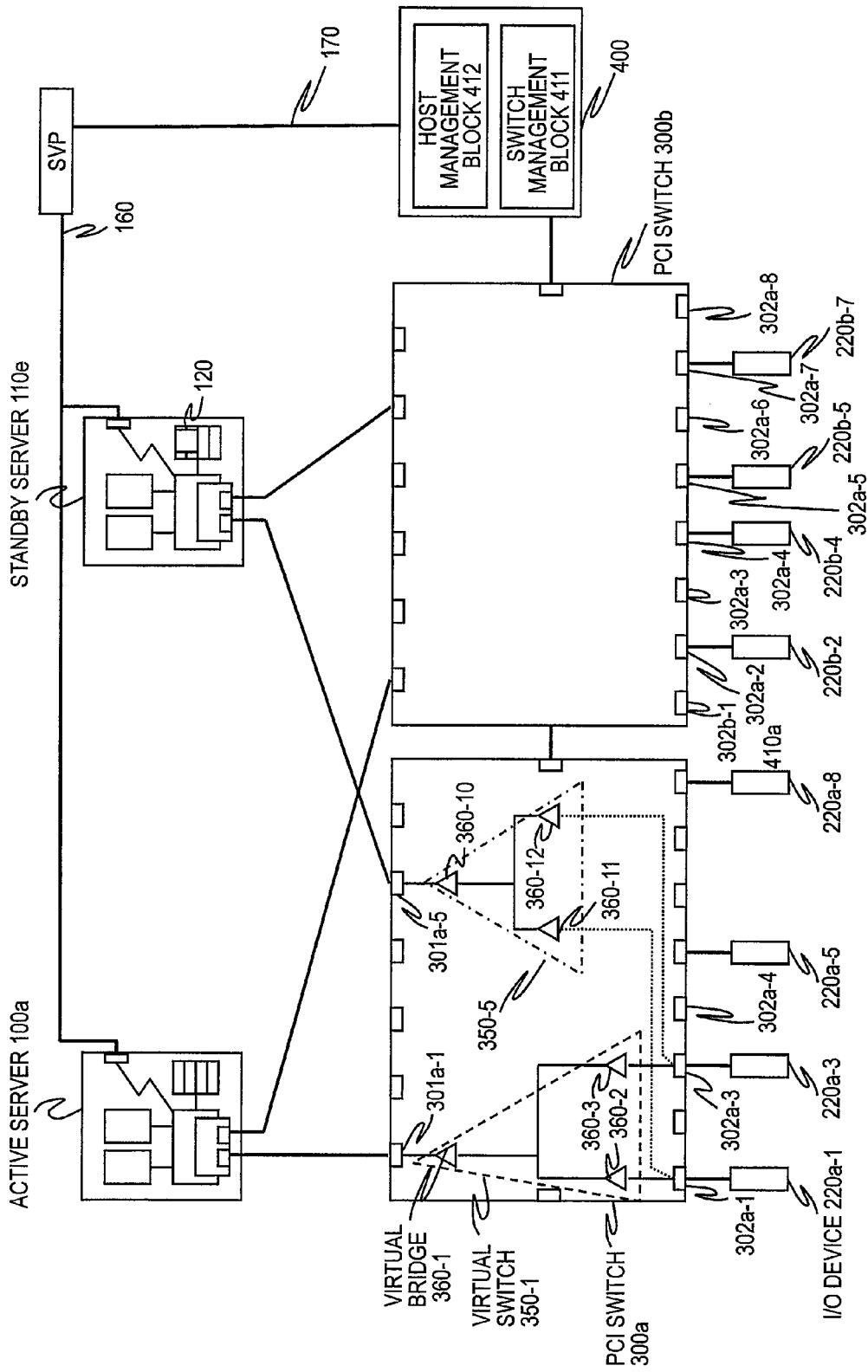
Figure 22:
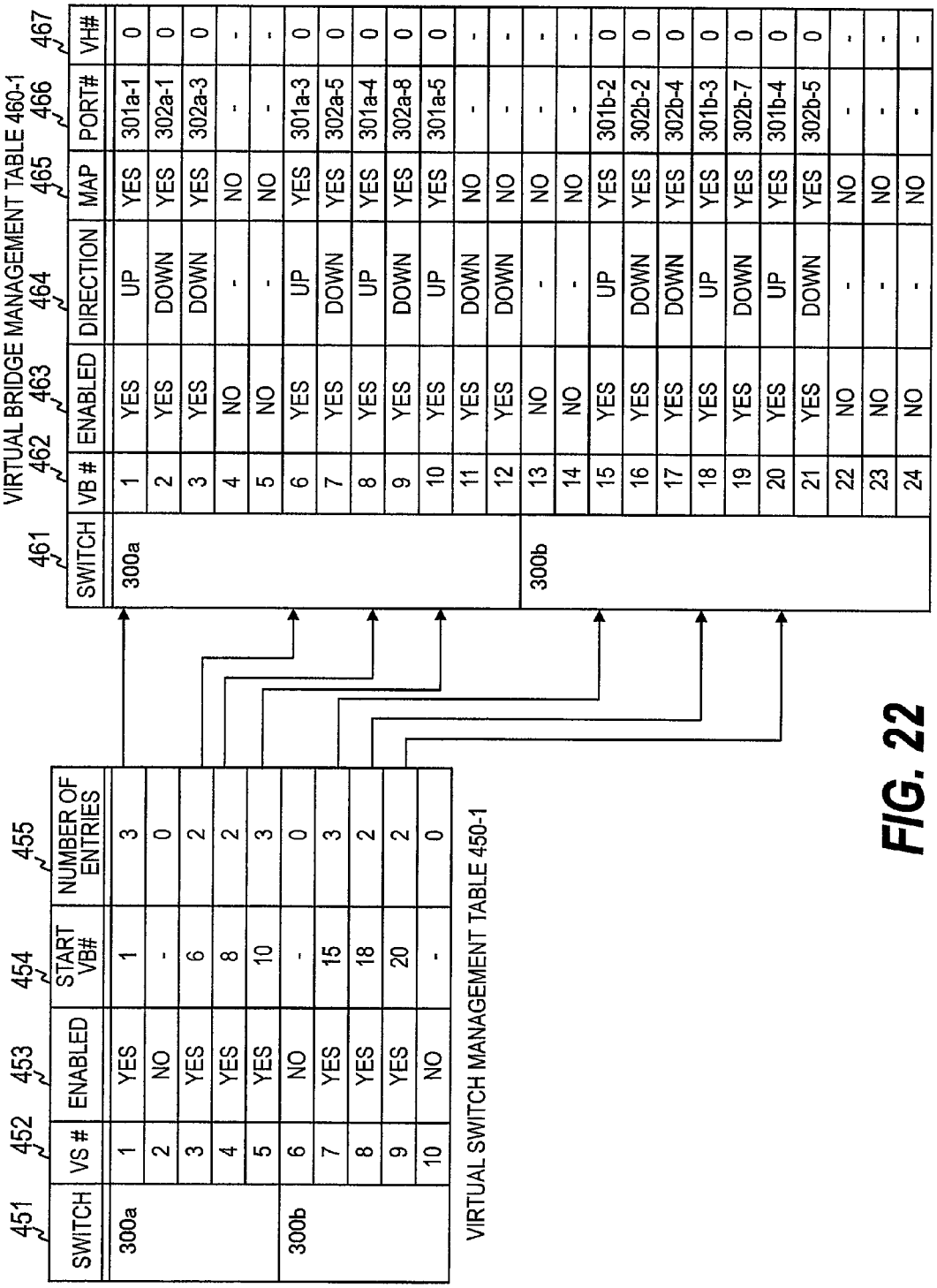
FIG. 22 shows a first embodiment of this invention, is an example in which, when an active server is using I/O devices, a standby server carries out the processing to check virtual paths up to the locations immediately before the I/O devices.

FIGS. 21 and 22 illustrate an example in which, when an active server 100 is using I/O devices 220, a standby server 110 carries out the processing to check virtual paths up to the locations immediately before the I/O devices 220. FIG. 21 is a block diagram illustrating an example of virtual switches 350-X and virtual bridges 360-Y, in which when the standby server 110e takes over the active server 100a, the processing of checking a virtual path up to the I/O devices 220a-1 and 220a-3 is executed. FIG. 22 illustrates an example of a virtual switch management table 450-1 and an example of a virtual bridge management table 460-1 when the virtual paths of FIG. 21 are added to the case illustrated in FIG. 6, and the new virtual paths from the standby server 110e to the I/O devices 220a-1 and 220a-3 are illustrated in thick lines.

A configuration of the computer system illustrated in FIG. 21 is the same as that of FIG. 1, and is described in the port management table 420 illustrated in FIG. 3, the resource assignment table 430 illustrated in FIG. 4, and the host management table 440 illustrated in FIG. 6. As illustrated in the resource assignment table 430 of FIG. 4, the active server 100a uses the I/O devices 220a-1 and 220a-3 coupled to the PCI switch 300a. Then, to the PCI switch 300a, the virtual switch 350-1 and the virtual bridges 360-1, 360-2, and 360-3 are set for selectively coupling the active server 100a to the I/O device 220a-1 or to the I/O device 220a-3.

The standby server 110e, which checks the access paths to the I/O devices 220 that are being used by the active server 100a, uses, as virtual paths, a virtual switch 350-5 set in the PCI switch 300a by the PCI manager 400. Here, the switch management block 411 of the PCI manager 400 generates the virtual paths such that a path tree from the standby server 110e to the I/O devices 220 has the same shape as the path tree from the active server 100a to the I/O devices 220.

The switch management block 411 constructs the virtual switch 350-5 by a virtual bridge 360-10 assigned to an upstream port 301a-5, a virtual bridge 360-11 assigned to the downstream port 302a-1, and a virtual bridge 360-12 assigned to the downstream port 302a-3. In other words, the virtual paths in the same shape as the path tree from the active server 100a to the I/O devices 220a-1 and 220a-3 are set to the PCI switch 300a.

On this occasion, the downstream port 302a-1 coupled to the I/O device 220a-1 is to be assigned to the virtual bridge 360-2 of the virtual switch 350-1 that is being used by the active server 100a, and to the virtual bridge 360-11 of the virtual switch 350-5 to be used by the standby server 110e. Then, as illustrated in a virtual bridge management table 460-1 of FIG. 22, the virtual bridge 360-2 used by the active server 100a is enabled to make access to the downstream port 302a-1 by setting the map 465 to "Yes", and the virtual bridge 360-11 used by the standby server 110e is inhibited from accessing the downstream port 302a-5 by setting the map 465 to "No".

Similarly, as illustrated in the virtual bridge management table 460-1 of FIG. 22, the virtual bridge 360-3 used by the active server 100a is enabled to make access to the downstream port 302a-3 by setting the map 465 to "Yes", and the virtual bridge 360-12 used by the standby server 110e is inhibited from accessing the downstream port 302a-3 by setting the map 465 to "No".

Therefore, when the standby server 110e causes the program to check standby path 120 to make access to the I/O device 220a-1 or 220a-3, access is to be made from the upstream port 301a-6 of the PCI switch 300a via the virtual switch 350-5 to the virtual bridge 360-11 or 360-12.

When the standby server 110e causes the program to check standby path 120 to make access to the I/O device 220a-1 or 220a-3, it is possible to detect a failure in the virtual path up to the location immediately before the I/O device 220a-1 or 220a-3.

In this way, when the active server 100a is using the I/O devices 220a-1 and 220a-3, it is possible to detect a failure in the virtual paths from the standby server 110e up to the locations immediately before the I/O devices 220a-1 and 220a-3. When a failure is detected, because the PCI manager 400 inhibits the standby server 110e from taking over the active server 100a. Hence, when a failure actually occurs to the active server 100a, and a standby server 110 is to take over the active server 100a, a further failure is prevented from occurring, and a standby server 110 free from a failure in virtual paths can take over application tasks.

Specifically, when a failure occurs to the active server 100a, the service processor 150 monitoring the active servers 100 makes an inquiry to the host management block 412 of the PCI manager 400 about standby servers 110 available for taking over the failed active server 100a. The host management block 412 refers to the standby hosts accessibility matrix 480 illustrated in FIG. 16, and returns identifiers of standby serves 110 which can take over the active server 100a. The service processor 150 can determine one of the standby servers 110 received from the host management block 412 for superseding the active server 100a. For example, in FIG. 16, when the active server 100b fails, the standby server 110e has a failure in a virtual path to an I/O device 220 used by the active server 100b, and is thus set to "NG". Thus, the host management block 412 returns an identifier of the standby server 110e which can take over the active server 100b to the service processor 150, thereby preventing, upon a failover to a standby server 110, a further failure from occurring.

Moreover, when a failure occurs in the virtual path from the standby server 110, the failure is notified to the management console 180 of the service processor 150, and hence an administrator or the like can recognize, before an active server 100 fails, the failure in the virtual path from the standby server 110, and can prepare for the failure in advance.

In this way, by detecting a failure in a virtual path (access path) from a standby server 110 up to a virtual bridge 360-Y immediately before the I/O device 220, the standby hosts accessibility matrix 480 and the standby hosts accessibility check table 470 managed by the host management block 412 can be used for detecting a failure in the virtual path from the standby server 110 to the I/O device 220.

Figure 23:
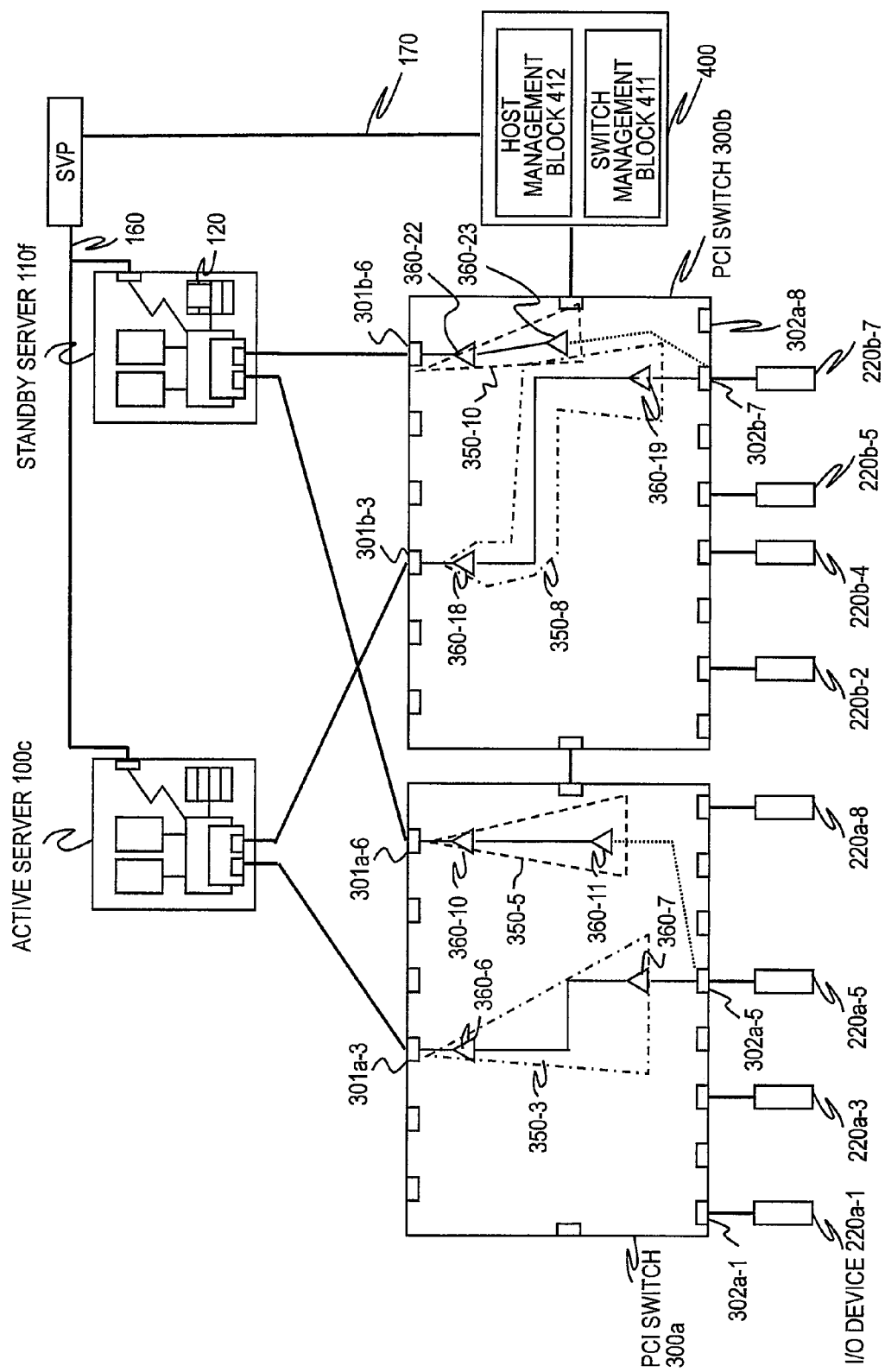
FIG. 23 shows a first embodiment of this invention, is a block diagram illustrating an example of virtual switches 350-X and virtual bridges 360-Y, in which when the standby server 110f takes over the active server 100c.
Figure 24:
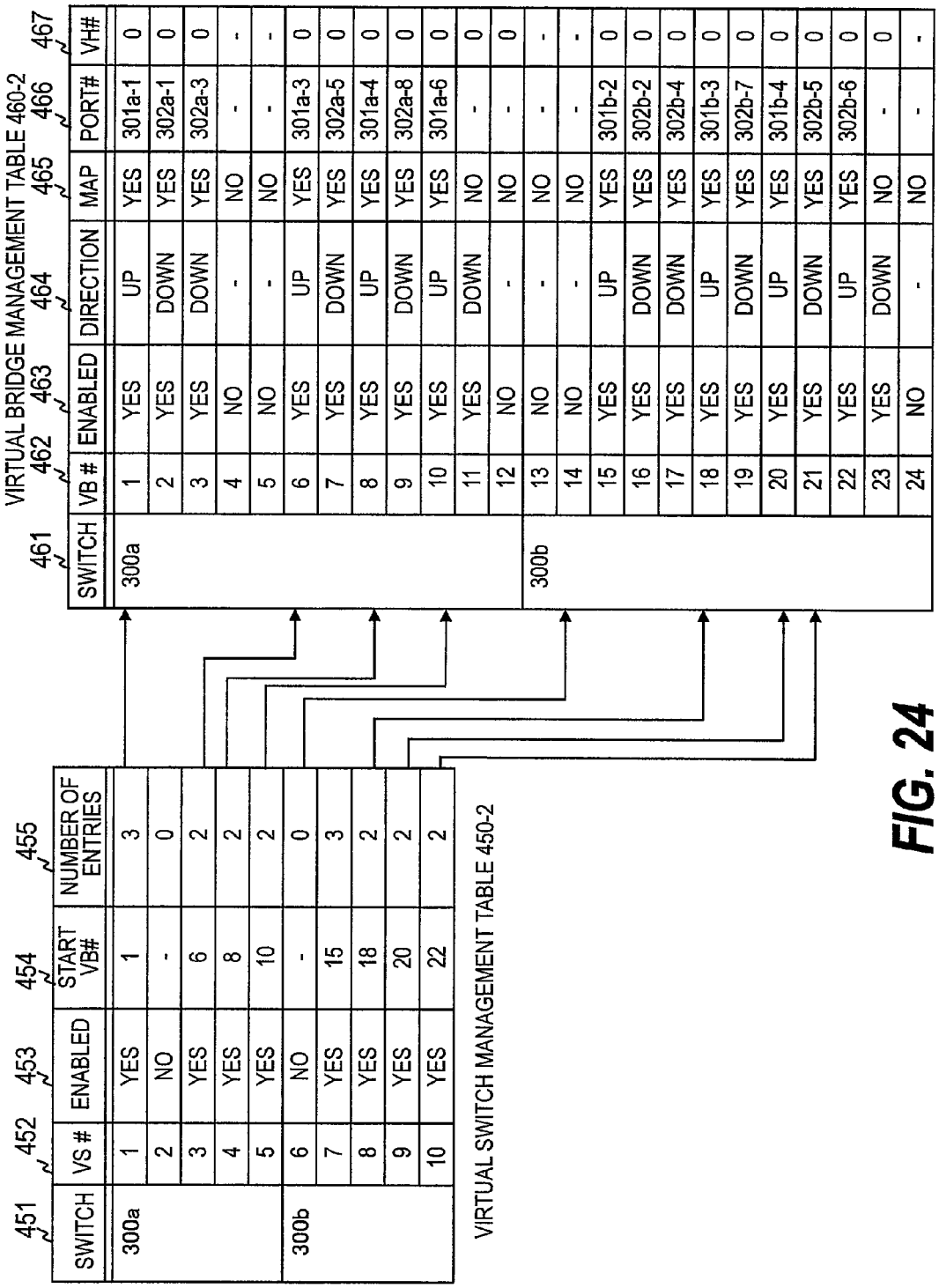
FIG. 24 shows a first embodiment of this invention, is an example of a virtual switch management table 450-2 and an example of a virtual bridge management table 460-2 when the virtual paths of FIG. 23.

FIGS. 23 and 24 illustrate an example in which, when an active server 100 is using I/O devices 220 via both the PCI switches 300a and 300b, a standby server 110 carries out the processing to check virtual paths up to the locations immediately before the I/O devices 220. FIG. 23 is a block diagram illustrating an example of virtual switches 350-X and virtual bridges 360-Y, in which when the standby server 110f takes over the active server 100c, the processing of checking a virtual path up to the I/O devices 220a-5 and 220b-7 is executed. FIG. 24 illustrates an example of a virtual switch management table 450-2 and an example of a virtual bridge management table 460-2 when the virtual paths of FIG. 23 are added to the case illustrated in FIG. 6, and the new virtual paths from the standby server 110f to the I/O devices 220a-5 and 220b-7 are illustrated in thick lines.

A configuration of the computer system illustrated in FIG. 23 is the same as that of FIG. 1, and is described in the port management table 420 illustrated in FIG. 3, the resource assignment table 430 illustrated in FIG. 4, and the host management table 440 illustrated in FIG. 6. As illustrated in the resource assignment table 430 of FIG. 4, the active server 100c uses an I/O device 220a-5 coupled to the PCI switch 300a, and an I/O device 220b-7 coupled to the PCI switch 300b. Then, to the PCI switch 300a, a virtual switch 350-3 and virtual bridges 360-6, and 360-7 are set for coupling the active server 100c to the I/O device 220a-5. To the PCI switch 300b, a virtual switch 350-8 and virtual bridges 360-18 and 360-19 are set for coupling the active server 100c to the I/O device 220b-7.

The active server 100c and the I/O device 220a-5 are coupled with each other via a virtual switch 350-3 including the virtual bridges 360-6 and 360-7, and the active server 100c and the I/O device 220b-7 are coupled with each other via the virtual switch 350-3 including the virtual bridges 360-18 and 360-19.

The standby server 110f, which checks the access paths to the I/O devices 220 that are being used by the active server 100c, uses, as virtual paths, the virtual switch 350-5 set in the PCI switch 300a and a virtual switch 350-10 set in the PCI switch 300b by the PCI manager 400. The switch management block 411 generates the virtual paths such that a path tree from the standby server 110f to the I/O devices 220 has the same shape as the path tree from the active server 100c to the I/O devices 220.

The switch management block 411 constructs the virtual switch 350-5 by the virtual bridge 360-10 assigned to the upstream port 301*a*-6, and the virtual bridge 360-11 assigned to the downstream port 302*a*-5. On this occasion, the downstream port 302*a*-5 coupled to the I/O device 220*a*-5 is to be assigned to the virtual bridge 360-7 of the virtual switch 350-3 that is being used by the active server 100*c*, and to the virtual bridge 360-11 of the virtual switch 350-5 to be used by the standby server 110*f*. Then, as illustrated in a virtual bridge management table 460-2 of FIG. 24, the virtual bridge 360-7 used by the active server 100*c* is enabled to make access to the downstream port 302 by setting the map 465 to "Yes", and the virtual bridge 360-11 used by the standby server 110*f* is inhibited (disabled) from accessing the downstream port 302*a*-5 by setting the map 465 to "No".

Therefore, when the standby server 110*f* causes the program to check standby path 120 to make access to the I/O device 220*a*-5, access is to be made from the upstream port 301*a*-6 of the PCI switch 300*a* via the virtual switch 350-5 to the virtual bridge 360-11. As a result, it is possible to detect whether or not the virtual path from the standby server 110*f* up to the location immediately before the I/O device 220*a*-5 is failed.

Then, the virtual switch 350-10 is constructed by a virtual bridge 360-22 assigned to an upstream port 301*b*-6 and a virtual bridge 360-23 assigned to a downstream port 302*b*-7. On this occasion, the downstream port 302*b*-7 coupled to the I/O device 220*b*-7 is to be assigned to the virtual bridge 360-19 of a virtual switch 350-8 that is being used by the active server 100*c*, and to the virtual bridge 360-23 of the virtual switch 350-10 to be used by the standby server 110*f*. Then, as illustrated in the virtual bridge management table 460-2 of FIG. 24, the virtual bridge 360-19 used by the active server 100*c* is enabled to make access to the downstream port 302*b*-7 by setting the map 465 to "Yes", and the virtual bridge 360-23 used by the standby server 110*f* is inhibited from accessing the downstream port 302*b*-7 by setting the map 465 to "No".

Therefore, when the standby server 110*f* causes the program to check standby path 120 to make access to the I/O device 220*b*-7, an access is to be made from the upstream port 301*b*-6 of the PCI switch 300*b* via the virtual switch 350-10 to the virtual bridge 360-23. As a result, it is possible to detect whether or not the virtual path from the standby server 110*f* up to the location immediately before the I/O device 220*b*-7 is failed.

In this way, when the active server 100*c* is using the I/O devices 220*a*-5 and 220*b*-7, it is possible to detect a failure in the virtual paths from the standby server 110*f* up to the locations immediately before the I/O devices 220*a*-5 and 220*b*-7. When a failure is detected, because the PCI manager 400 inhibits the standby server 110*f* from superseding the active server 100*c*. Hence, when a failure actually occurs to the active server 100*c*, and a standby server 110 is to take over the active server 100*c*, a further failure is prevented from occurring, and a standby server 110 free from a failure in virtual paths can take over application tasks. Moreover, when a failure occurs in the virtual path from the standby server 110, the failure is notified to the management console 180 of the service processor 150, and hence an administrator or the like can recognize, before an active server 100 fails, the failure in the virtual path from the standby server 110, and can prepare for the failure in advance.

Second Embodiment

Figure 25:
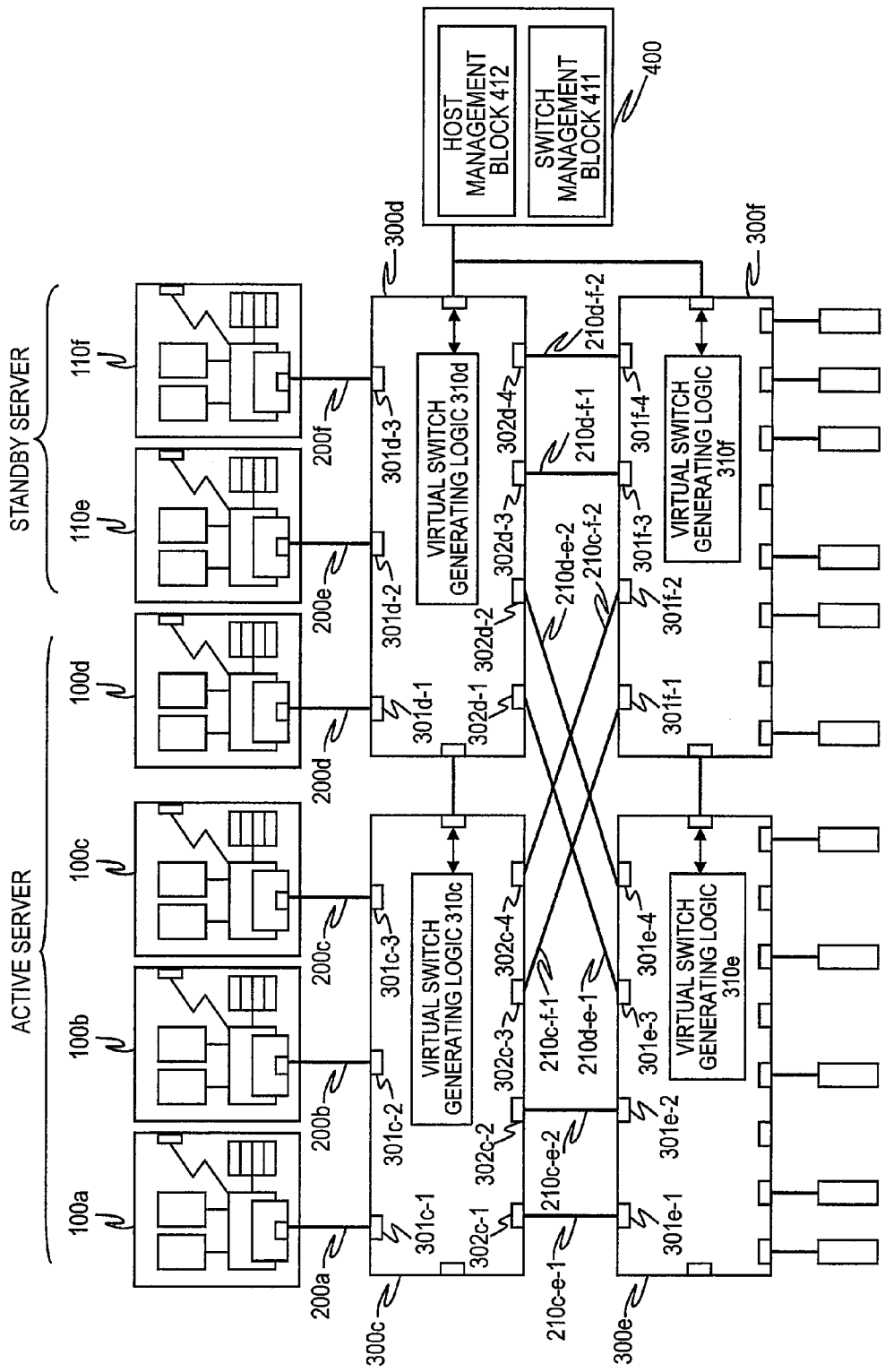
FIG. 25 illustrates a second embodiment of this invention, in which the PCI switches 300.

FIG. 25 illustrates a second embodiment of this invention, in which the PCI switches 300 according to the first embodiment are configured in multiple stages, and the rest of the configuration is the same as that of the first embodiment. It should be noted that the service processor 150, the management console 180, and the paths for management are not illustrated.

PCI switches 300*c*, 300*d*, 300*e*, and 300*f* are coupled with each other, the PCI switches 300*c* and 300*d* are coupled to the active servers 100 and the standby servers 110, and the PCI switches 300*e* and 300*f* are coupled to the I/O devices 220.

The respective tables of the PCI manager 400 are to mange the ports, virtual switches, and virtual bridges of the PCI switches 300*c* to 300*f*. Also in this case, as in the first embodiment, while the active servers 100 are operating, it is possible to detect whether or not virtual paths from the standby servers 110 to the virtual bridges set in the PCI switches 300*e* and 300*f* immediately before the I/O devices 220 are failed.

Third Embodiment

Figure 26:
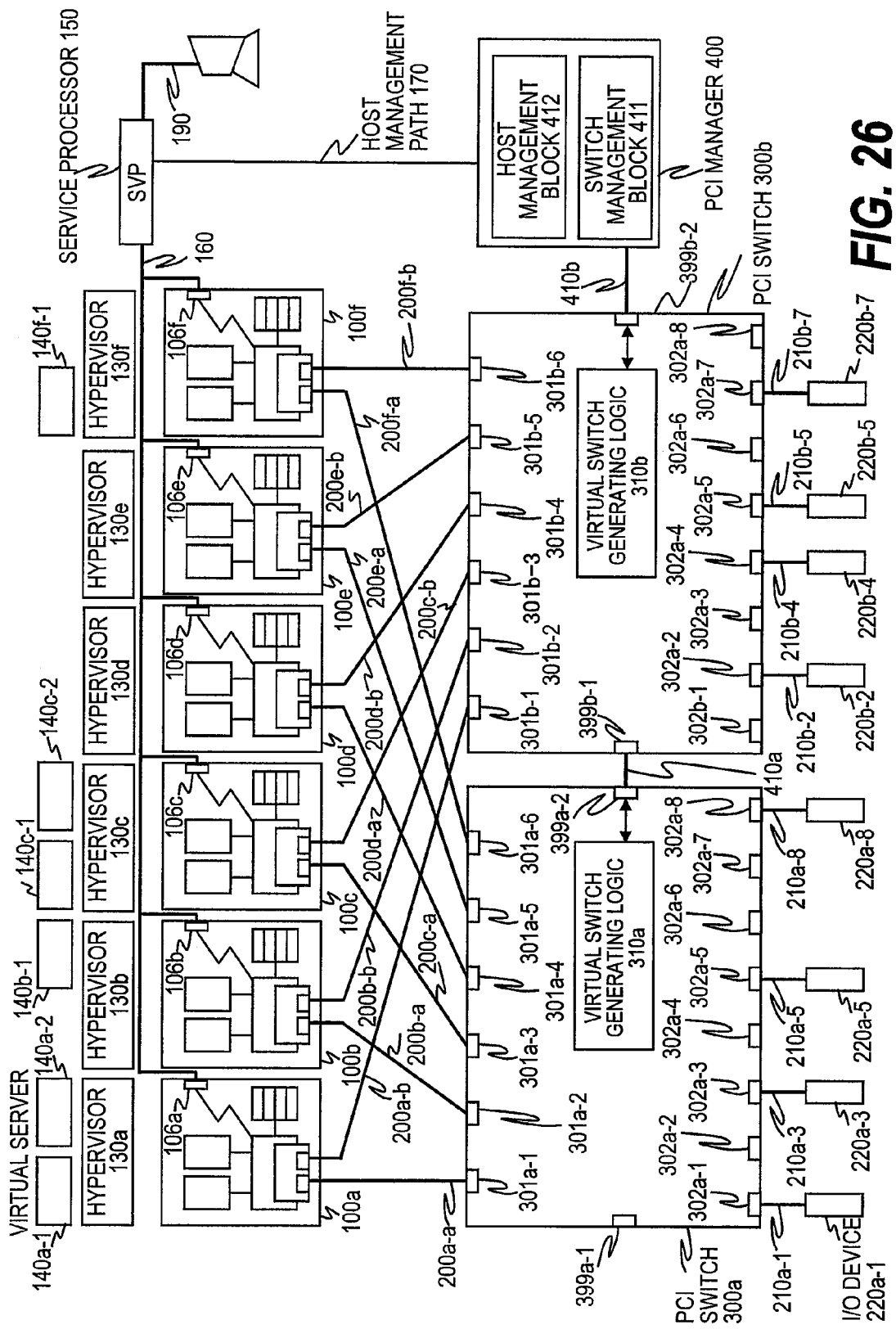
FIG. 26 illustrates a third embodiment of this invention, in which hypervisors 130a to 130f are operated on physical computers including the active servers 100 and the standby servers 110.

FIG. 26 illustrates a third embodiment of this invention, in which hypervisors 130*a* to 130*f* are operated on physical computers including the active servers 100 and the standby servers 110 according to the first embodiment, and virtual servers 140*a*-1 to 140*f*-1 are operated on the hypervisors 130*a* to 130*f*. The rest of the configuration is the same as that of the first embodiment.

When an active server 100 fails, a standby server 110 takes over virtual servers operating on the active server 100.

The third embodiment is different from the first embodiment in that the assignment of the I/O devices 220 carried out by the PCI manger 400 is carried out for the virtual servers 140*a*-1 to 140*f*-1. As a result, the resource assignment table 430 stores identifiers of the virtual servers in addition to the identifiers of the physical computers (hosts 433).

Also in this case, as in the first embodiment, while the virtual servers on the active servers 100 are operating, it is possible to detect whether or not virtual paths from the virtual servers on the standby servers 110 to the virtual bridges set in the PCI switches 300 immediately before the I/O devices 220 are failed.

Though, according to the above-mentioned embodiments, the standby state of the standby servers is the cold standby, the standby state may be the hot standby.

Moreover, though, according to the above-mentioned embodiments, the service processor 150 is an independent computer, an active server 100 may operate as the service processor 150, or the service processor 150 and the PCI manager 400 may be executed on the same computer. Moreover, the service processor 150 and the PCI manager 400 may be executed on a virtual server.

As described above, this invention can be applied to a computer system provided with multi-root PCI switches, and can especially preferably be applied to a computer system having the cluster configuration.

While the present invention has been described in detail and pictorially in the accompanying drawings, the present invention is not limited to such detail but covers various obvious modifications and equivalent arrangements, which fall within the purview of the appended claims.

The invention claimed is:

1. A computer system comprising:
   a plurality of servers each comprising a processor, a memory, and an interface;
   a PCI switch coupled to the plurality of servers via the interfaces;
   an I/O device coupled to the PCI switch; and
   a management block for managing a configuration of the PCI switch, wherein:

the management block comprises:
  a switch management block for setting a first access path coupling an active server of the plurality of servers and the I/O device with each other; and
  a host management block for instructing a standby server, which takes over the active server, of the plurality of servers to make access to the I/O device used by the active server;
the switch management block is configured to:
  set, to the PCI switch, the first access path comprising a first virtual bridge coupling the interface of the active server and a first virtual switch with each other, and a second virtual bridge coupling the I/O device, used by the active server, and the first virtual switch with each other; and
  set, to the PCI switch, a second access path comprising a third virtual bridge coupling the interface of the standby server and a second virtual switch with each other, and a fourth virtual bridge coupling the I/O device, used by the active server which the standby server takes over, and the second virtual switch with each other, and disable mapping between the I/O device, used by the active server which the standby server takes over, and the fourth virtual bridge of the second access path
wherein the host management block instructs, after the second access path is set, the standby server to make access to the fourth virtual bridge coupled to the I/O device, used by the active server which the standby server takes over,
the standby server makes access to the fourth virtual bridge coupled to the I/O device, used by the active server which the standby server takes over, according to the instruction from the host management block, and
the host management block receives access results from the standby server, and determines, when the access results indicates a failure, that the standby server cannot take over the active server.

2. The computer system according to claim 1, wherein the switch management block causes a path tree of the second access path to have the same shape as a path tree of the first access path.

3. The computer system according to claim 1, wherein the host management block receives a result of the access to the second access path from the second server, and holds information indicating whether or not the second access path is accessible.

4. The computer system according to claim 1, further comprising a failover control logic for monitoring an operation status of the active server, and, when the active server fails, causing one of a plurality of standby servers to act as the standby server to take over processing being carried out by the active server, wherein:
  the host management block receives an access result of the second access path from the standby server, and holds information indicating whether or not the standby server can take over the active server for each of the plurality of standby servers; and
  the failover control logic refers to, when the active server fails, the information held by the host management block and indicating whether or not the one of the plurality of the standby servers can take over the active server, thereby determining the standby server from the plurality of standby servers to take over the active server.

5. The computer system according to claim 1, wherein:
  the active server executes a virtual server;
  the standby server supersedes the virtual server.

6. The computer system according to claim 1, further comprising a failover control logic for managing the active server and the standby server,
  wherein the host management block receives a result of the access to the fourth virtual bridge via the second access path from the second server, and, when the result of the access is abnormal, notifies the failover control logic of the abnormality.

7. The computer system according to claim 1, wherein the host management block acquires a result of the access received from the standby server as a status of an access path from the standby server to the I/O device.

8. The computer system according to claim 1, wherein: a plurality I/O devices including the I/O device are coupled to the PCI switch:
  The switch management block sets, for each of the plurality of the I/O devices used by the active server, the second access path; and
  The host management block is configured to:
    Sequentially instruct the standby server to make access to the fourth virtual bridge coupled to each of the plurality of the I/O devices; and
    Receive access results from the standby server, and determine, when one of the access result indicates a failure, that the standby server cannot take over the active server.

9. A method of monitoring an access path from a server to an I/O device, which is used for a computer system comprising:
  a plurality of servers each comprising a processor, a memory, and an interface;
  a PCI switch coupled to the plurality of servers via the interfaces;
  the I/O device coupled to the PCI switch; and
  a management block for managing a configuration of the PCI switch, the method comprising:
  setting, to the PCI switch, by the management block, a first access path comprising a first virtual bridge coupling the interface of an active server of the plurality of servers and a first virtual switch with each other, and a second virtual bridge coupling the I/O device and the first virtual switch with each other;
  setting, to the PCI switch, by the management block, a second access path comprising a third virtual bridge coupling the interface of a standby server of the plurality of the servers and a second virtual switch with each other, and a fourth virtual bridge coupling the I/O device, used by the active server which the standby server takes over, and the second virtual switch with each other, and disabling mapping between the I/O device, used by the active server which the standby server takes over, and the fourth virtual bridge of the second access path; and
  instructing, by the host management block, after the second access path is set, the standby server, which takes over the first server, to make access to the fourth virtual bridge coupled to the I/O device used by the active server which the standby server takes over.

* * * * *